US008520095B2

(12) United States Patent
Uchida

(10) Patent No.: US 8,520,095 B2
(45) Date of Patent: Aug. 27, 2013

(54) IMAGING APPARATUS AND IMAGING METHOD

(75) Inventor: Akihiro Uchida, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 444 days.

(21) Appl. No.: 12/562,269

(22) Filed: Sep. 18, 2009

(65) Prior Publication Data

US 2010/0073529 A1 Mar. 25, 2010

(30) Foreign Application Priority Data

Sep. 19, 2008 (JP) ................................. 2008-241091

(51) Int. Cl.
*H04N 5/232* (2006.01)
(52) U.S. Cl.
USPC .................. 348/230.1; 348/208.12; 348/229.1
(58) Field of Classification Search
USPC ...................................................... 348/230.1
See application file for complete search history.

(56) References Cited

U.S. PATENT DOCUMENTS 7,355,754 B2     4/2008 Terashita
7,750,950 B2 *   7/2010 Tamaru et al. ............. 348/227.1
2003/0214600 A1* 11/2003 Kido ............................ 348/362
2004/0239963 A1  12/2004 Terashita
2007/0223059 A1   9/2007 Oishi

FOREIGN PATENT DOCUMENTS

JP   2003-274280 A    9/2003
JP   2003-348339 A   12/2003
JP   2006-148591 A    6/2006

OTHER PUBLICATIONS

Japanese Office Action for Japanese Application No. 2008-241091, dated Jan. 24, 2012.

* cited by examiner

*Primary Examiner* — Anthony J Daniels
(74) *Attorney, Agent, or Firm* — Birch, Stewart, Kolasch & Birch, LLP

(57) ABSTRACT

An imaging apparatus is equipped with: imaging means constituted by a great number of first light receiving elements and second light receiving elements that photoelectrically convert light from subjects, which are capable of being controlled to be driven independently form each other and are arranged in a predetermined arrangement, for obtaining image signals based on the output of the first light receiving elements and/or the second light receiving elements; image signal processing means, for generating image data from the image signals obtained by the imaging means; subject discriminating means, for discriminating subject scenes based on the image signals; subject field data obtaining means, for obtaining subject field data based on the image signals; and control means, for selecting a drive mode to drive the imaging means and the image signal processing means, based on the discriminated subject scenes and the obtained subject field data.

18 Claims, 12 Drawing Sheets

FIG.2
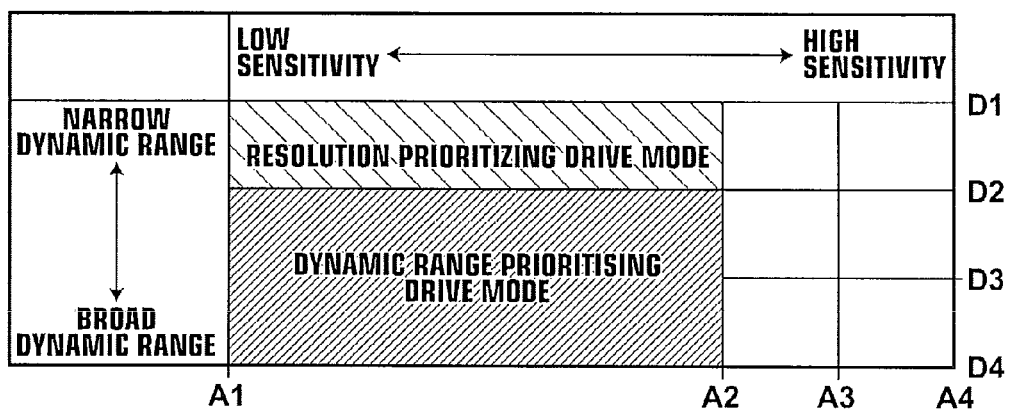
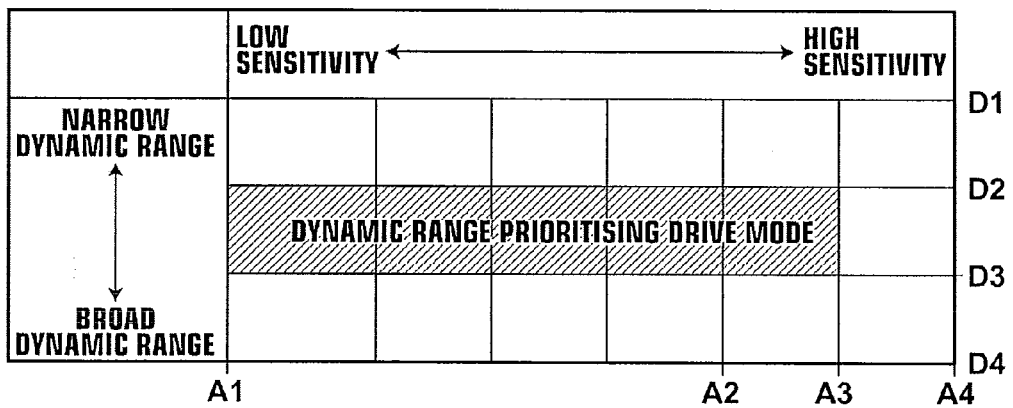
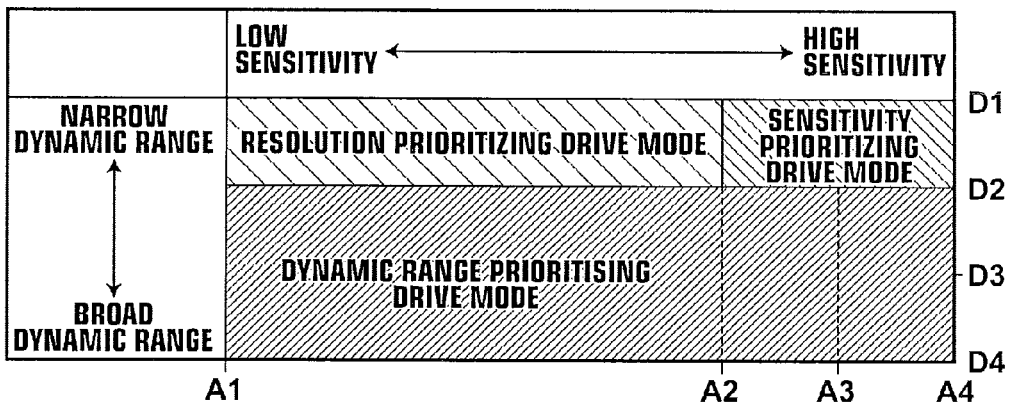

FIG.3A
♦ FIRST METHOD
1  MAIN PIXELS (STANDARD EXPOSURE)
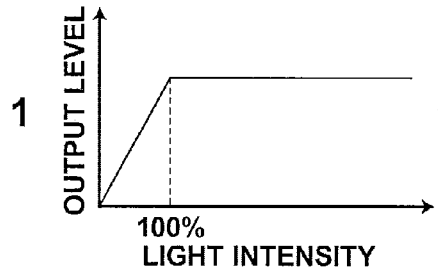 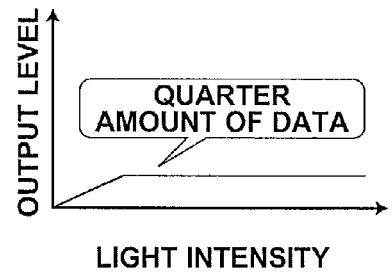
QUARTER AMOUNT OF DATA
2  SUB PIXELS (UNDER EXPOSURE)
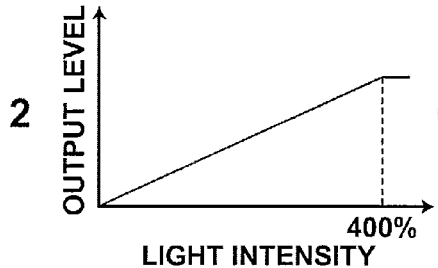 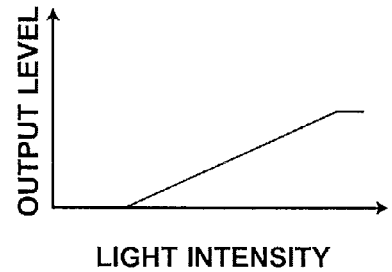
3  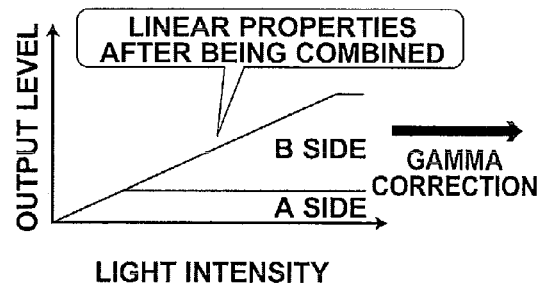
LINEAR PROPERTIES AFTER BEING COMBINED
B SIDE
A SIDE
GAMMA CORRECTION
FIG.3B
♦ SECOND METHOD
MAIN PIXELS (UNDER EXPOSURE)
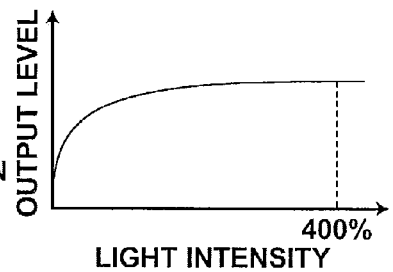
GAMMA CORRECTION

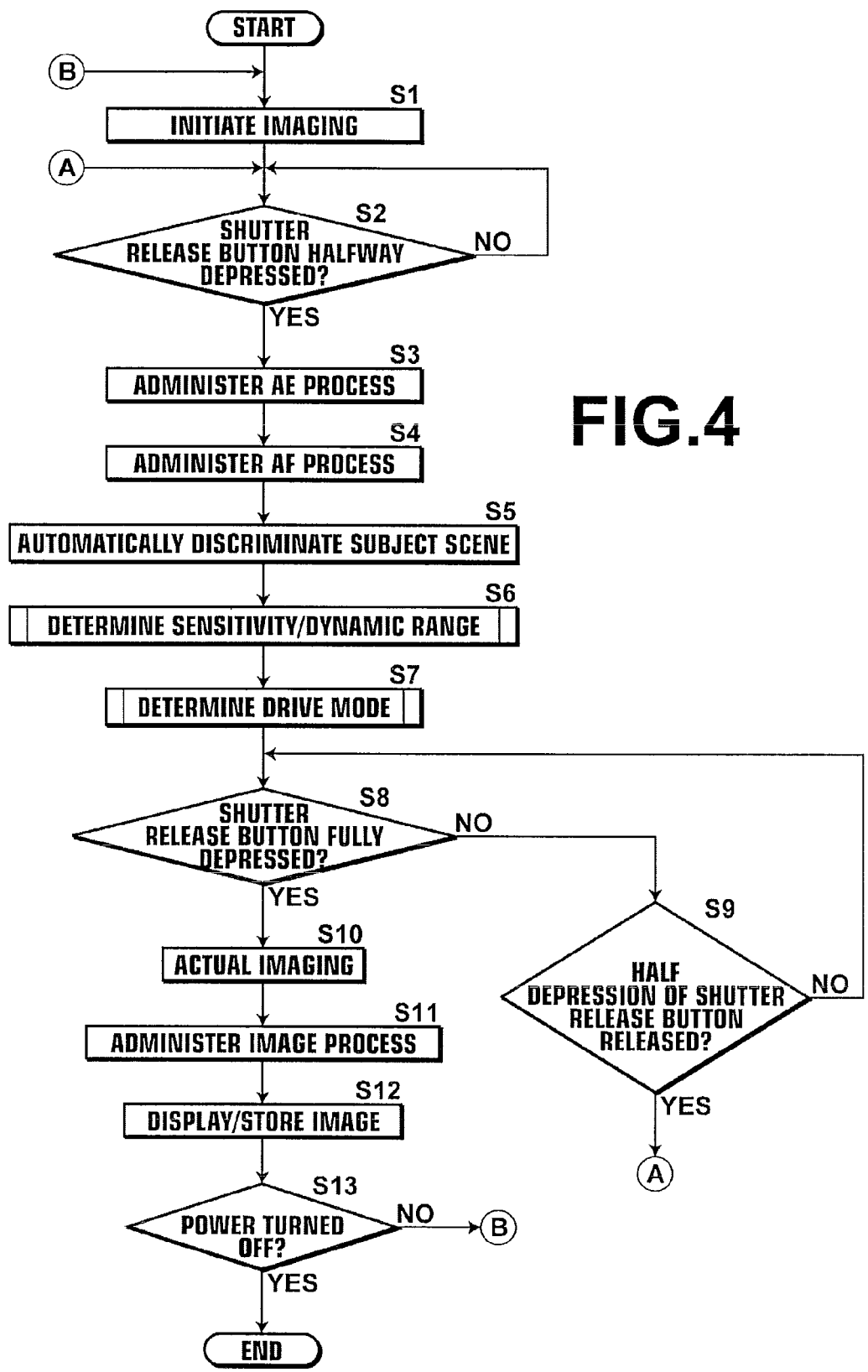

FIG.9
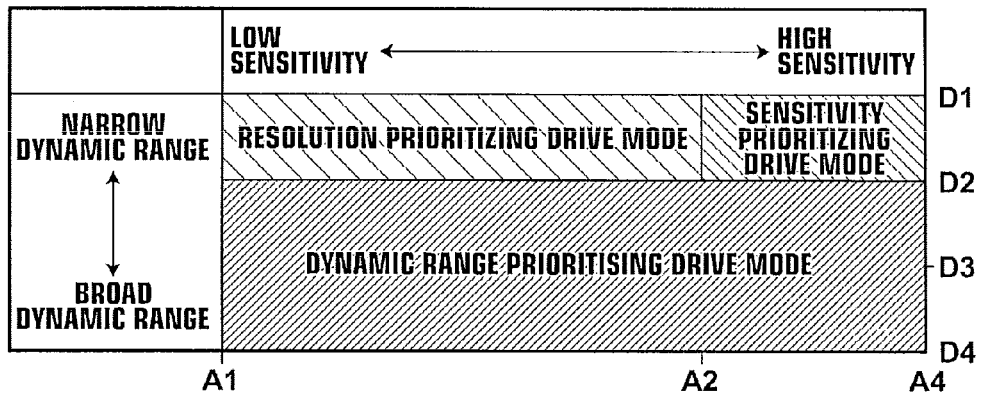
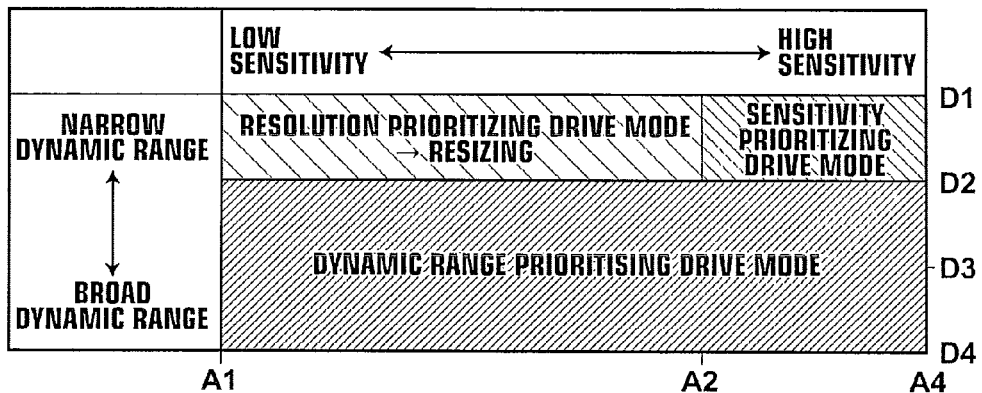

FIG.12
SCENERY (DRIVE PATTERN 6)
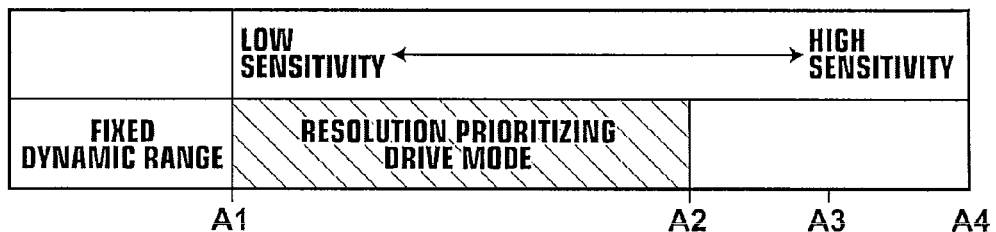
PORTRAIT (DRIVE PATTERN 7)
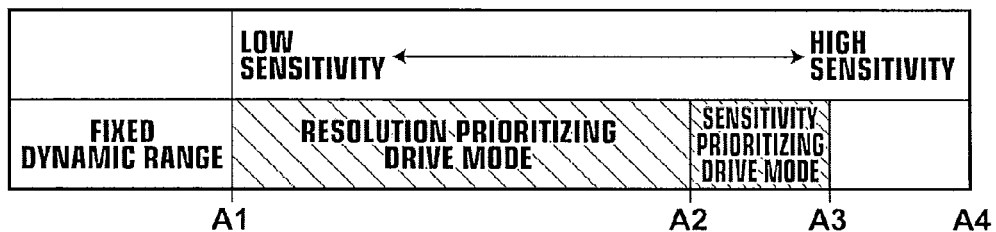
NIGHT SCENE (DRIVE PATTERN 8)
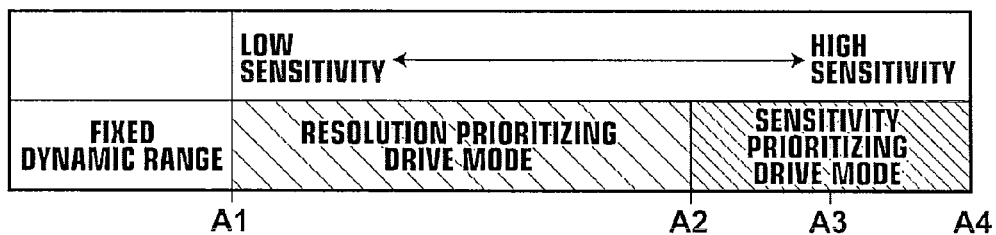

IMAGING APPARATUS AND IMAGING METHOD

BACKGROUND OF THE INVENTION

1. Field of the Invention

The present invention is related to an imaging apparatus such as a digital camera. More specifically, the present invention is related to an imaging apparatus and an imaging method that utilizes an imaging element equipped with two types of light receiving elements, which are capable of being controlled and driven independently from each other.

2. Description of the Related Art

CCD's, which are imaging means employed in digital cameras, have narrower dynamic ranges than silver salt film. Therefore, overexposure and underexposure are likely to occur in images photographed by digital cameras. For this reason, various imaging techniques for obtaining image data sets having expanded dynamic ranges have been proposed. A first example of such an imaging technique is that in which a plurality of image data sets which have been obtained under different exposure conditions are combined. A second example of such an imaging technique is that in which a CCD, constituted by an arrangement of main pixels (first light receiving elements) having high sensitivities and sub pixels (second light receiving elements) having smaller areas than the main pixels and therefore lower sensitivities but are less likely to be saturated, is utilized. In this technique, high sensitivity image data obtained by the main pixels and low sensitivity image data obtained by the sub pixels are combined, to obtain a combined image data set that exhibits favorable reproduction properties over a wide range from high brightness to low brightness.

U.S. Patent Application Publication No. 20070223059 discloses an imaging apparatus that utilizes the aforementioned second technique. This imaging apparatus switches the process by which image signals are processed based on a dynamic range prioritizing drive mode, a resolution prioritizing drive mode, a sensitivity prioritizing drive mode, a color reproduction prioritizing drive mode or the like, which is selected by a user or selected according to scenes. Japanese Unexamined Patent Publication No. 2006-148591 also discloses an imaging apparatus that utilizes the aforementioned second technique. This imaging apparatus switches the drive method of the two types of CCD's according to subject field scenes.

In addition to providing different light receiving areas, changing the exposure times of light receiving elements is another technique for imparting sensitivity differences among light receiving elements.

In the imaging apparatuses described above, the drive mode is determined for each scene. Therefore, the image signal processing method and the CCD drive method are determined simultaneously with discrimination of a scene.

There are two general types of scenes which are discriminated. The first is a subject field scene (subject field data) such as the brightness of a subject and color temperature. The second is a subject scene, such as scenery, portrait, and night scene. If the image processing method and the CCD drive method is determined only on the discrimination results of the subject field scene, if the brightness and the color temperature of subjects are the same value, that is, if the results of discrimination of the subject field scene are the same, the same image signal processing method and the same CCD drive method are used regardless of whether the subject scene is a portrait or scenery. Accordingly, the obtained image may not be an optimal image of the subject. Similarly, if the image signal processing method and the CCD drive method are determined based only on the discrimination results of the subject scene, the obtained image may not be an optimal image of the subject.

SUMMARY OF THE INVENTION

The present invention has been developed in view of the foregoing circumstances. It is an object of the present invention to provide an imaging apparatus and an imaging method which are capable of obtaining optimal images of subjects.

An imaging apparatus of the present invention comprises:

imaging means constituted by a number of first light receiving elements and second light receiving elements that photoelectrically convert light from subjects, which are capable of being controlled so as to be driven independently form each other and are arranged in a predetermined arrangement, for obtaining image signals based on the output of at least one of the first light receiving elements and the second light receiving elements;

image signal processing means, for generating image data from the image signals obtained by the imaging means;

subject discriminating means, for discriminating subject scenes based on the image signals;

subject field data obtaining means, for obtaining subject field data based on the image signals; and control means, for selecting a drive mode to drive the imaging means and the image signal processing means, based on the subject scenes discriminated by the subject discriminating means and the subject field data obtained by the subject field data obtaining means.

Note that in the present invention, examples of the "predetermined arrangement" include: an arrangement in which the first light receiving elements and the second light receiving elements are alternately provided in rows and columns at a constant pitch; a honeycomb arrangement in which the first light receiving elements are provided in odd numbered rows, the second light receiving elements are provided in even numbered rows, and the first light receiving elements of the odd numbered rows and the second light receiving elements of the even numbered rows are shifted by ½ a pitch; and the like. The term "subject scene" refers to the type of subject, such as scenery, night scene, and portrait. The term "subject field data" refers to the values of brightness, color temperature, and the like of the subject. The term "drive mode" refers to driving methods of the imaging means, such as a resolution prioritizing drive mode, a sensitivity prioritizing drive mode, and a dynamic range prioritizing drive mode, as well as the types of signal processing methods performed by the image signal processing means.

The imaging apparatus of the present invention may further comprise:

drive pattern determining means, for determining a drive pattern from among at least two types of drive patterns that include at least one type of drive modes, in which the range of at least one imaging condition of the imaging means is set, based on the subject scene discriminated by the subject discriminating means; and drive mode determining means, for determining a drive mode from among the at least one type of drive mode of the drive pattern determined by the drive pattern determining means, based on the subject field data obtained by the subject field data obtaining means; wherein:

the control means drives the imaging means and the image signal processing means with the drive mode determined by the drive mode determining means.

In this case, it is preferable for the drive patterns to be set for each of the subject scenes.

Note that in the present specification, the term "imaging conditions" includes sensitivity values and dynamic range values.

In addition, the imaging apparatus of the present invention may further comprise:

setting means, for setting a settable range of at least one of a sensitivity value and a dynamic range value of the imaging means, based on the subject scene discriminated by the subject discriminating means;

imaging condition determining means, for determining the value of at least one of the sensitivity value and the dynamic range value within the at least one range set by the setting means, based on the subject field data obtained by the subject field data obtaining means; and drive mode determining means, for determining a drive mode based on at least one of the sensitivity value and the dynamic range value determined by the imaging condition determining means; wherein:

the control means drives the imaging means and the image signal processing means with the drive mode determined by the drive mode determining means.

In the imaging apparatus of the present invention, it is preferable for the drive mode to be one of: a resolution prioritizing drive mode; a sensitivity prioritizing drive mode; and a dynamic range prioritizing drive mode.

A configuration may be adopted, wherein:

when the imaging means and the image signal processing means are driven in the dynamic range prioritizing drive mode, the control means switches between a first imaging method, in which the imaging means performs imaging with different exposures for the first light receiving elements and the second light receiving elements and the image signal processing means processes image signals formed based on the outputs of the first light receiving elements and the second light receiving elements that have performed imaging with different exposures to obtain image data, and a second imaging method, in which the imaging means performs imaging with the first light receiving elements and the second light receiving elements at the same underexposure and the image signal processing means administers gradation correcting processes on image signals formed based on the outputs of the first light receiving elements and the second light receiving elements to obtain image data.

In the imaging apparatus of the present invention, it is preferable for the subject scene to be one of: scenery; portrait; and night scene.

In the imaging apparatus of the present invention, it is preferable for a configuration to be adopted, wherein:

the subject scene is one of: scenery; portrait; and night scene;

the drive pattern includes only the dynamic range prioritizing drive mode when the subject scene is a portrait, and the range of values for the dynamic range is set from D2 to D3 and the range of values for the sensitivity is set from A1 to A3 in the dynamic range prioritizing drive mode;

the drive pattern includes the resolution prioritizing drive mode and the dynamic range prioritizing drive mode when the subject scene is scenery, the range of values for the dynamic range is set from D1 to D2 and the range of values for the sensitivity is set from A1 to A2 in the resolution prioritizing drive mode, and the range of values for the dynamic range is set from D2 to D4 and the range of values for the sensitivity is set from A1 to A2 in the dynamic range prioritizing drive mode;

the drive pattern includes the resolution prioritizing drive mode, the sensitivity prioritizing drive mode, and the dynamic range prioritizing drive mode when the subject scene is night scene, the range of values for the dynamic range is set from D1 to D2 and the range of values for the sensitivity is set from A1 to A2 in the resolution prioritizing drive mode, the range of values for the dynamic range is set from D1 to D2 and the range of values for the sensitivity is set from A2 to A4 in the sensitivity prioritizing drive mode, and the range of values for the dynamic range is set from D2 to D4 and the range of values for the sensitivity is set from A1 to A4 in the dynamic range prioritizing drive mode; and D1, D2, D3, and D4 and A1, A2, A3, and A4 satisfy the conditions of D1<D2<D3<D4 and A1<A2<A3<A4.

An imaging method of the present invention utilizes an imaging apparatus equipped with an imaging element constituted by a great number of first light receiving elements and second light receiving elements that photoelectrically convert light from subjects, which are capable of being controlled so as to be driven independently form each other and are arranged in a predetermined arrangement, and comprises the steps of:

obtaining image signals based on the output of at least one of the first light receiving elements and the second light receiving elements;

generating image data from the obtained image signals;

discriminating subject scenes based on the image signals;

obtaining subject field data based on the image signals;

selecting a drive mode, based on the discriminated subject scenes discriminated and the obtained subject field data; and driving the imaging element with the selected drive mode to obtain the image signals, and generating the image data from the image signals.

In the imaging method of the present invention, a configuration may be adopted wherein:

at least two types of drive patterns that include at least one type of drive modes, in which the range of at least one imaging condition of the imaging element is set in advance, are set;

a single drive pattern is determined from among the at least two types of drive patterns, based on the discriminated subject scene;

a drive mode is determined from among the at least one type of drive mode of the determined drive pattern, based on the obtained subject field data; and the imaging element is driven with the determined drive mode to obtain the image signals, and the image data is generated from the image signals.

The imaging method of the present invention may further comprise the steps of:

setting a settable range of at least one of a sensitivity value and a dynamic range value of the imaging means, based on the discriminated subject scene;

determining the value of at least one of the sensitivity value and the dynamic range value within the at least one set range, based on the obtained subject field data; and determining a drive mode based on at least one of the determined sensitivity value and the determined dynamic range value; wherein:

the imaging element is driven with the determined drive mode to obtain the image signals, and the image data is generated from the image signals.

According to the imaging apparatus and the imaging method of the present invention, image signals are obtained based on the outputs of at least one of the first light receiving elements and the second light receiving elements; the subject scene is discriminated and the subject field data is obtained based on the obtained image signals; a drive mode is selected based on the obtained subject scene and the obtained subject field data; the imaging element is driven according to the selected drive mode to obtain image signals; and image data is generated from the obtained image signals. Therefore, optimal images of subjects can be obtained, because the imaging means (including the imaging element) is driven and controlled and image processes are administered according to a drive mode selected based on data regarding both the subject scene and the subject field.

BRIEF DESCRIPTION OF THE DRAWINGS

FIG. 2 is a diagram that illustrates examples of various drive patterns.

FIG. 3A is a set of diagrams for explaining an image processing method in a first method of a dynamic range prioritizing drive mode.

FIG. 3B is a diagram for explaining an image processing method in a second method of a dynamic range prioritizing drive mode.

FIG. 4 is a flow chart that illustrates the steps of an imaging process executed by the digital camera.

FIG. 9 is a diagram that illustrates alternate examples of various drive patterns.

FIG. 12 is a diagram that illustrates further examples of various drive patterns.

DESCRIPTION OF THE PREFERRED EMBODIMENTS

Hereinafter, an imaging apparatus according to an embodiment of the present invention will be described in detail with reference to the attached drawings. Note that in the following embodiment, a digital camera 1 will be described as the imaging apparatus of the present invention. However, the present invention is not limited to being applied to digital cameras, and may be applied to various types of electronic devices, such as a cellular telephone with built in camera, a PDA with built in camera, and other devices equipped with electronic imaging functions.

Figure 1:
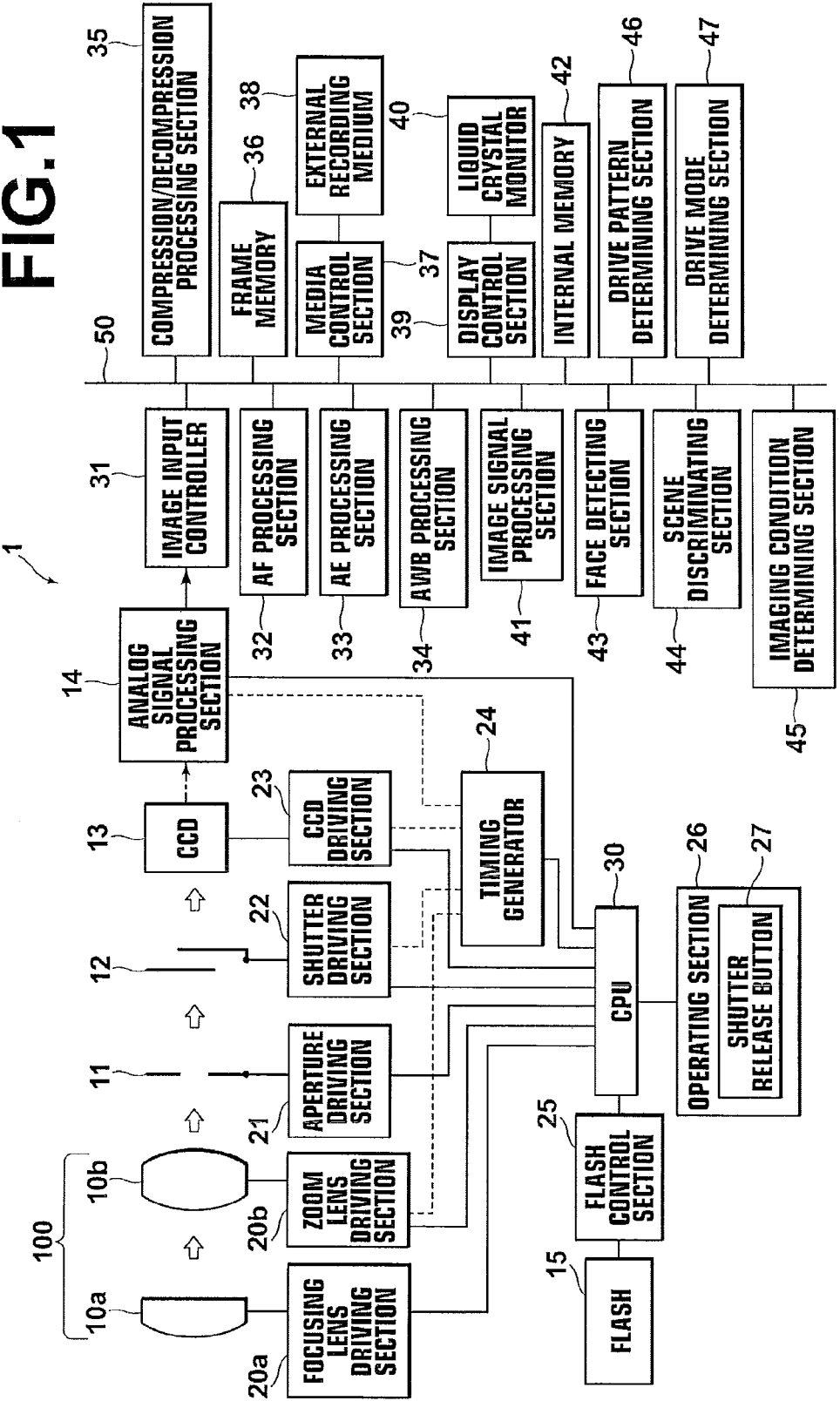
FIG. 1 is a functional block diagram that illustrates the construction of a digital camera.

FIG. 1 is a block diagram that illustrates the functional construction of the digital camera 1. As illustrated in FIG. 1, the digital camera of the present embodiment is equipped with an operating section 26 that transmits the operations of a shutter release button 27, a menu/OK button (not shown), a zoom/up and down arrow buttons (not shown) and the like to a CPU 30.

Imaging lenses 100 focus images of subjects onto a predetermined image focusing surface (a CCD provided in the interior of the main body of the camera). The imaging lenses 100 are constituted by a focusing lens 10a and a zoom lens 10b. Each of the focusing lens 10a and the zoom lens 10b are driven in a stepwise manner by a focus lens driving section 20a and a zoom lens driving section 20b, which are respectively constituted by a motor and a motor driver, so as to be movable in the direction of the optical axes thereof. The focusing lens driving section 20a drives the focusing lens 10a in a stepwise manner based on focus driving amount data output from an AF processing section 32 to be described later. The zoom lens driving section 20b controls the stepwise driving of the zoom lens 10b based on operation amount data from the zoom/up and down arrow buttons (of the operating section 26).

An aperture 11 is driven by an aperture driving section 21 constituted by a motor and a motor driver. The aperture driving section 21 adjusts how much the aperture 11 is opened based on aperture value data output from an AE processing section 33 to be described later.

A shutter 12 is a mechanical shutter, and is driven by a shutter driving section 22 constituted by a motor and a motor driver. The shutter driving section 22 controls the opening and closing of the shutter 12 according to a signal which is generated when the shutter release button 27 is released, and also according to shutter speed data output from the AE processing section 33.

A CCD 13 (imaging means) is provided toward the rear of the optical system described above. The CCD 13 has a photoelectric converting surface, in which a plurality of first light receiving elements and a plurality of second light receiving elements which are capable of being controlled and driven independent from each other and have the same area are arranged in a honeycomb arrangement. The honeycomb arrangement refers to an arrangement in which the first light receiving elements are provided in odd numbered rows, the second light receiving elements are provided in even numbered rows, and the first light receiving elements of the odd numbered rows and the second light receiving elements of the even numbered rows are shifted by ½ a pitch. Light from subjects which has passed through the optical system is focused onto the photoelectric converting surface, and photoelectrically converted. A microlens array (not shown) for focusing light onto each pixel, and a color filter array, in which R, G, and B filters are arranged in a regular manner, are provided in front of the photoelectric converting surface.

The CCD outputs serial analog image signals by reading out electric charges which are accumulated in each pixel one line at a time, synchronized with vertical transfer clock signals and horizontal transfer clock signals provided by a CCD driving section 23. The amounts of time that charges are accumulated at the pixels corresponding to each of the first light receiving elements and the second light receiving elements, that is, exposure times, are determined by electronic shutter driving signals provided separately for the first light receiving elements and the second light receiving elements by the CCD driving section 23.

The analog image signals output by the CCD 13 are input into an analog signal processing section 14. The analog signal processing section 14 is constituted by: a correlated double sampling (CDS) circuit for removing noise from the analog image signals; an automatic gain controller (AGC) for adjusting the gain for the analog image signals; and an A/D converter (ADC) for converting the analog image signals to digital image data. The digital image data that the analog image signals are converted into are CCD-RAW data having RGB density values for each pixel.

A timing generator 24 generates timing signals. The timing signals are input to the shutter driving section 22, the CD driving section 23, and the analog signal processing section 14, to synchronize the operation of the shutter release button 27, the opening and closing of the shutter 12, the charge accumulation at the CCD 13, and the processing by the analog signal processing section 14.

A flash 15 instantaneously emits light necessary for photography toward subjects while the shutter 12 is open by the shutter release button 27 being depressed. A flash control section 25 controls the light emitting operation of the flash 15.

An image input controller 31 writes the CCD-RAW data input from the analog signal processing section 14 in a frame memory 36. The frame memory 36 is a memory used as workspace for various types of digital image processes (signal processing) on the image data, which will be described later, and comprises an SDRAM (Synchronous Dynamic Random Access Memory) that carries out data transfer in synchronization with a bus clock signal of a predetermined period, for example.

A display control section 39 is used to display the image data stored in the frame memory 36 as a through the lens image on a liquid crystal monitor 40. The display control section 39 converts luminance (Y) signals and color (C) signals into unified composite signals, and outputs the composite signals to the liquid crystal monitor 40. The through the lens image is obtained at predetermined intervals and displayed on the liquid crystal monitor 40 when the photography mode is selected. In addition, the display control section 39 displays images based on image data included in image files which are stored in external recording media 38 and read out by a media control section 37 on the liquid crystal monitor 40.

The AF processing section 32 detects a focusing position based on image data, determines a focus setting value (focusing drive amount), and outputs focusing drive amount data. A passive method, in which a characteristic that a focus evaluation value (contrast value) of images increases in a focused state is utilized, may be applied to detect the focusing position. Alternatively, an active method, in which distances to subjects are detected by a distance measuring sensor and the measurement results are utilized, may be employed.

The AE processing section 33 measures the luminance of subjects (photometric value) based on image data, and determines exposure conditions such as an aperture value, an exposure time (shutter speed) and the like, based on the luminance. The AE processing section 33 then outputs aperture value data and exposure time data (AE processing). Generally, if the exposure time is set to be long, the shutter speed becomes slow and blurring due to shaky hands becomes likely to occur. On the other hand, if the exposure time is set to be short, the shutter speed becomes hast and blurring due to shaky hands becomes less likely to occur. If the exposure time is excessively long, overexposure occurs, resulting in obtained photographs becoming whitish. If the exposure time is excessively short, underexposure occurs, resulting in obtained photographs becoming dark.

An AWB processing section 34 calculates color temperature based on image data, and automatically adjusts white balance (AWB processing) during actual imaging according to the calculated color temperature. Note that the AWB processing section 34 may adjust white balance prior to imaging or following imaging. Note that the AE processing section 33 and the AWB processing section 34 function as subject field data obtaining means for obtaining subject field data, such as the brightness of the subject, color temperature, and the like.

An image signal processing section 41 (image signal processing means) administers different signal processes onto the image signals input from the image input controller by processing methods that differ according to drive modes to be described later. Note that the processing methods will be described in detail later. In addition, the image signal processing section 41 administers image quality enhancement processes such as Gamma correction, sharpness correction, and contrast correction on image data of final images. Further, the image signal processing section 41 also administers YC processes to convert the CCD-RAW data into YC data comprising Y data as a luminance signal, Cb data as a blue color difference signal, and Cr data as a red color difference signal.

Note that the final image is an image based on the image data stored in the frame memory 36 via the analog signal processing section 14 and the image input controller 31 after input of the analog image data from the CCD 13, in response to a full depression of the shutter release button 27. The maximum number of pixels of the final image is determined by the number of the pixels of the CCD 13. However, the number of pixels to be recorded can be changed by the user, by setting the image quality to possible settings (such as full pixels, half pixels, and automatic selection of pixel numbers). The number of pixels of the through the lens image may be less than that of the final image, and may be $\frac{1}{16}$ that of the final image, for example.

A compression/decompression section 35 carries out compression processes to a format such as JPEG on the image data, which has been subjected to the image enhancement processes and the like by the image signal processing section 41, and generates an image file. Accompanying information, such as photography date/time and whether the image has been photographed in a portrait right protecting mode, is added as tags to the image file, based on the Exif format. The compression/decompression section 35 also reads compressed images files from the external recording media 38 in the playback mode, and administers decompression processes thereon. Image data, on which the decompression processes have been administered, are output to the display control section 39, and displayed on the liquid crystal monitor 40.

The media control section is equipped with a media slot into which the external recording media 38 are loaded. When an external recording medium 38 is loaded into the media slot, data is read out from and written into the external recording medium 38. The media control section 37 carries out image-file reading and writing from and to the external recording media 38.

An internal memory 42 has various constants which are set within the digital camera 1 and programs to be executed by the CPU 30 stored therein.

A face detecting section 43 periodically detects human faces from image data which are stored in the frame memory 36, that is, the through the lens images. Specifically, the face detecting section 43 detects regions having characteristics which are included in faces (such as being skin colored, having eyes, and having the shape of a face) as face regions. The faces may be detected by various known techniques, such as: matching image data of eyes; from the positional relationships among eyes and mouths; by detecting the outlines of faces; and by detecting color data that corresponds to the skin of faces. Note that the face detecting section 43 is automatically set to an ON state when an automatic scene discrimination mode is ON.

A scene discriminating section 44 (subject discriminating means) discriminates subject scenes within image data, based on the subject distance data detected by the AF processing section 32, the photometric value data detected by the AE processing section 33, the color temperature data detected by the AWB processing section 34, and the results of face detection by the face detecting section 43. Scenery, portraits, and night scenes are discriminated as subject scenes in the present embodiment.

The scene discriminating section 44 discriminates the subject scene to be a portrait in the case that the face detecting section 43 detects a face. The scene discriminating section 44 discriminates the subject scene to be scenery in the case that the subject distance is far, and the subject brightness is brighter than a predetermined threshold value. The scene discriminating section 44 discriminates the subject scene to be a night scene in the case that the subject distance is far, and the subject brightness is darker than a predetermined threshold value. Note that the method for discriminating subject scenes is not limited to that described above, and other known discriminating methods may be utilized.

An imaging condition determining section 45 determines the values for photography sensitivity and dynamic range, based on the photometric value data detected by the AE processing section 33, and set exposure values such as aperture value and exposure time (shutter speed).

A drive pattern determining section 46 determines a drive pattern to be employed from among two or more (three in the present embodiment) drive patterns, in which settable ranges of the sensitivity and the dynamic range value of the CCD 13 are set, based on the subject scene discriminated by the subject discriminating section 44. Examples of the drive patterns are illustrated in FIG. 2. The drive patterns are set in the camera main body in advance, and are recorded in the internal memory 42, for example. As illustrated in FIG. 2, each drive pattern includes at least one drive mode. For example, in drive pattern 1, which is selected in the case that the subject scene is scenery, the sensitivity A of the CCD 13 is limited to be settable within a range from A1 to A2 (A1<A≦A2) and the dynamic range D of the CCD 13 is limited to be settable within a range from D1 to D4 (D1<D≦D4). Within these ranges, resolution prioritizing drive modes are selected in cases in which the dynamic range D is within a range from D1 to D2 (D1<D≦D2), and dynamic range prioritizing drive modes are selected in cases in which the dynamic range D is within a range from D2 to D4 (D2<D≦D4).

Similarly, in drive pattern 2, which is selected in the case that the subject scene is a portrait, the sensitivity A of the CCD 13 is limited to be settable within a range from A1 to A3 (A1<A≦A3) and the dynamic range D of the CCD 13 is limited to be settable within a range from D2 to D3 (D2<D≦D3). Only a dynamic range prioritizing drive mode is set within these ranges. In drive pattern 3, which is selected in the case that the subject scene is a night scene, the sensitivity A of the CCD 13 is limited to be settable within a range from A1 to A4 (A1<A≦A4) and the dynamic range D of the CCD 13 is limited to be settable within a range from D1 to D4 (D1<D≦D4). Within these ranges, resolution prioritizing drive modes are selected in cases in which the dynamic range D is within a range from D1 to D2 (D1<D≦D2) and the sensitivity A is within a range from A1 to A2 (A1<A≦A2), sensitivity prioritizing drive modes are selected in cases in which the dynamic range D is within a range from D1 to D2 (D1<D≦D2) and the sensitivity A is within a range from A2 to A4 (A2<A≦A4), and dynamic range prioritizing drive modes are selected in cases in which the dynamic range D is within a range from D2 to D4 (D2<D≦D4) and the sensitivity A is within a range from A1 to A4 (A1<A≦A4).

In the case that the subject scene is a portrait, the skin of human subjects may become overexposed. Therefore, only the dynamic range prioritizing modes that prevent overexposure of bright portions are set. In the case that the subject scene is a night scene, it is desired to perform imaging with as fast a shutter speed as possible in order to suppress blurring due to shaky hands even if the subject is dark, and therefore the sensitivity prioritizing drive mode is included in drive pattern 3. In the case that the subject scene is scenery, the sensitivity is suppressed such that noise caused due to excessively high sensitivity can be reduced. Note that in the present embodiment, "sensitivity" refers to SV values of ISO sensitivity.

A drive mode determining section 47 determines a single drive mode from among the drive modes included in the drive pattern determined by the drive pattern determining section 46, based on the subject field data obtained by the AE processing section 33 and the AWB processing section 34 that function as the subject field data obtaining means and the values for sensitivity and dynamic range which are ultimately determined by the imaging condition determining section 45.

In the present embodiment, there are three drive modes for driving the CCD 13 and the image signal processing section 41. The three drive modes are: the resolution prioritizing drive mode for performing photography with high resolution; the sensitivity prioritizing drive mode, for performing photography with high sensitivity and a high S/N ratio; and the dynamic range prioritizing drive mode, for performing photography with broad dynamic range.

In the resolution prioritizing drive mode, the CCD driving section 23 drives the CCD 13 such that the exposure times of the first light receiving elements and the second light receiving elements are equal. The image signal processing section 41 is driven such that it does not combine the outputs of the main pixels corresponding to the first light receiving elements and the sub pixels corresponding to the second light receiving element. Instead, the image signal processing section 41 treats the outputs of each of the first light receiving elements and the second light receiving elements as a single pixel. Signals output by all of the pixels, that is, full pixels, are utilized, to secure a great number of pixels for generating a single image data set.

In the sensitivity prioritizing drive mode, the CCD driving section 23 drives the CCD 13 such that the exposure times of the first light receiving elements and the second light receiving elements are equal. The image signal processing section 41 is driven such that the outputs of the main pixels corresponding to the first light receiving elements and the sub pixels corresponding to the second light receiving element are added to generate combined output signals. The combined signals are utilized to generate an image data set having half the number of pixels. The added output signals have twice the outputs of the signals output by only the main pixels or the signals output by only the sub pixels. Therefore, the sensitivity is twice that of a full pixel image.

Note that in the present embodiment, the image signal processing section 41 performs the process to combine the signals after they are output from the main pixels and the sub pixels. Alternatively, the signals may be combined during readout from the CCD 13, and read out as combined signals.

In the dynamic range prioritizing drive mode, the CCD driving section 23 drives the CCD 13 such that the exposure times of the first light receiving elements and the second light receiving elements are different. The image signal processing section 41 is driven such that it does not combine the outputs of the main pixels corresponding to the first light receiving elements and the sub pixels corresponding to the second light receiving element. Instead, the image signal processing section 41 treats the outputs of each of the first light receiving elements and the second light receiving elements as a single pixel. The image signals having different output levels are processed to generate an image data set in which the dynamic range is expanded.

FIG. 3A is a diagram for explaining a first image signal processing method which may be employed in the dynamic range prioritizing drive mode. For example, in the case that the dynamic range is to be expanded by four times, the exposure amount of the main pixels is set to a standard exposure amount, while the exposure amount of the sub pixels is set to ¼ the standard exposure amount, as illustrated in FIG. 3A. That is, the sub pixels perform imaging at underexposure. Thereby, output properties are obtained wherein the outputs of the main pixels become saturated at an exposure amount of 100%, while the outputs of the sub pixels become saturated at an exposure amount of 400%. Therefore, image data for obtaining low brightness data are obtained from the main pixels (A side), and image data for obtaining high brightness data are obtained from the sub pixels (B side). Then the outputs of the main pixels and the sub pixels are combined.

When combining the outputs of the main pixels and the sub pixels, first, the amount of data output from the main pixels is reduced to ¼ as illustrated in the right side of FIG. 3A1, to cause the inclination properties of the outputs of the main pixels and the outputs of the sub pixels to match. Then, the portion of the output of the sub pixels (the left side of FIG. 3A2) corresponding to the quartered output of the main pixels is subtracted from the output of the sub pixels. Next, the output of the sub pixels from which the portion has been subtracted (the right side of FIG. 3A2) is added to the quartered output of the main pixels (the right side of FIG. 3A1), to generate a single combined image data set, as illustrated in FIG. 3A3. Gamma correction is administered onto the combined image data set to restore an appropriate brightness, to generate an image data set in which the dynamic range has been expanded four times.

In a second image signal processing method that may be employed in the dynamic range prioritizing drive mode, the CCD driving section 23 drives the CCD 13 such that the exposure times of the first light receiving elements and the second light receiving elements are equal, and such that imaging is performed with an underexposure at a step number corresponding to the dynamic range. The image signal processing section 41 is driven such that gamma correcting processes are administered onto the obtained image data to restore the brightness of the image, to generate an image data set in which the dynamic range has been expanded.

FIG. 3B is a diagram for explaining the second image signal processing method which is employed in the dynamic range prioritizing drive mode. For example, in the case that the dynamic range is to be expanded by four times, the exposure amounts of the main pixels and the sub pixels are set to ¼ a standard exposure amount, as illustrated in FIG. 3B. That is, the main pixels and the sub pixels perform imaging at underexposure. By performing imaging at underexposure, output properties are obtained wherein the outputs of the main pixels and the sub pixels become saturated at an exposure amount of 400%, as opposed to becoming saturated at an exposure amount of 100% in the case that imaging is performed at the standard exposure. Then, gamma correction is administered onto the image data set obtained by underexposure to restore an appropriate brightness, to generate an image data set in which the dynamic range has been expanded four times.

Note that at this time, the outputs from the two types of pixels may be read out as combined outputs, or the outputs from the two types of pixels may be combined after being read out, to generate an image data set having half the number of pixels.

In the second image signal processing method, the same effects as those obtained by increasing gain (increased noise) are obtained by administering the gamma correction process. That is, the gamma correction process is equivalent to increasing gain. Therefore, dynamic range cannot be expanded by gamma correction in cases that imaging is performed with low sensitivity.

Note that in the present embodiment, either of the first and second image signal processing methods may be utilized in the case that the dynamic range prioritizing drive mode is selected. The first image signal processing method may be utilized in cases that the sensitivity A is less than a predetermined threshold value, for example. Thereby, expansion of dynamic range becomes possible even when imaging is performed with low sensitivity. However, because a difference in exposure times is created in the first image signal processing method, there is a drawback that the image data cannot be combined favorably due to blur when long exposure photography is performed. The second image signal processing method has a drawback that dynamic range cannot be expanded at low sensitivities. Therefore, whether to utilize the first image signal processing method or the second image signal processing method may be determined based on shutter speed and whether flash is to be emitted.

The CPU 30 controls the components of the digital camera 1 according to operations of the operating section 26 and signals from each of the functional blocks. The CPU 30 also functions as a control means for driving the CCD 13 via the CCD driving section 23 and for driving the image signal processing section 41 according to the drive mode which is determined (selected) by the drive mode determining section 47.

A data bus 50 is connected to the image input controller 31, the various processing sections 14, 32 through 35 and 41, the frame memory 36, the control sections 25, 37, and 39, the face detecting section 43, the internal memory 42, the scene discriminating section 44, the determining sections 45 through 47 and the CPU 30. Various signals and data are transmitted through the data bus 50.

Figure 5:
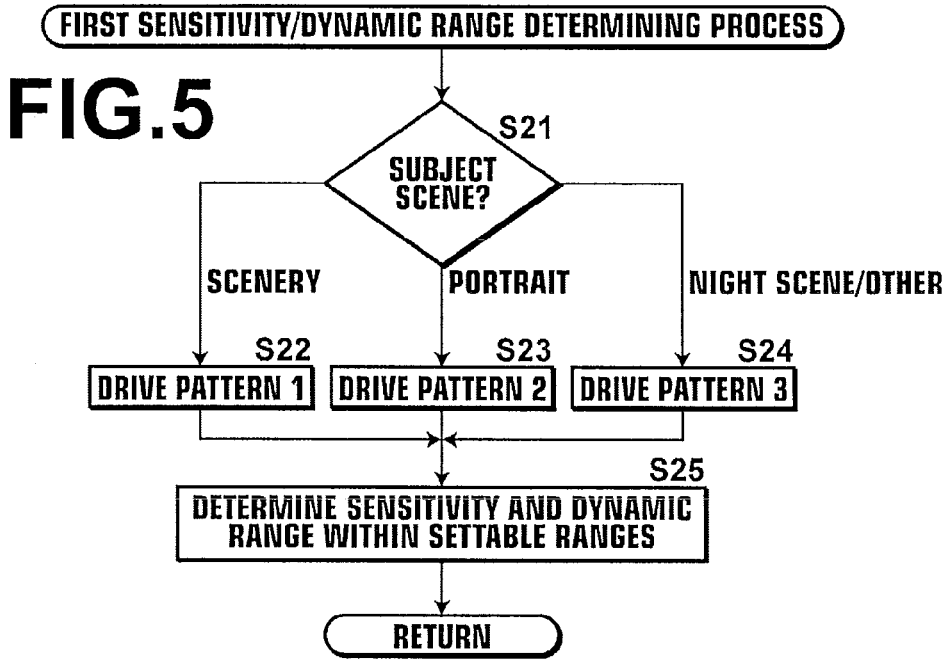
FIG. 5 is a flow chart that illustrates the steps of a first process for determining sensitivity and dynamic range values.
Figure 6:
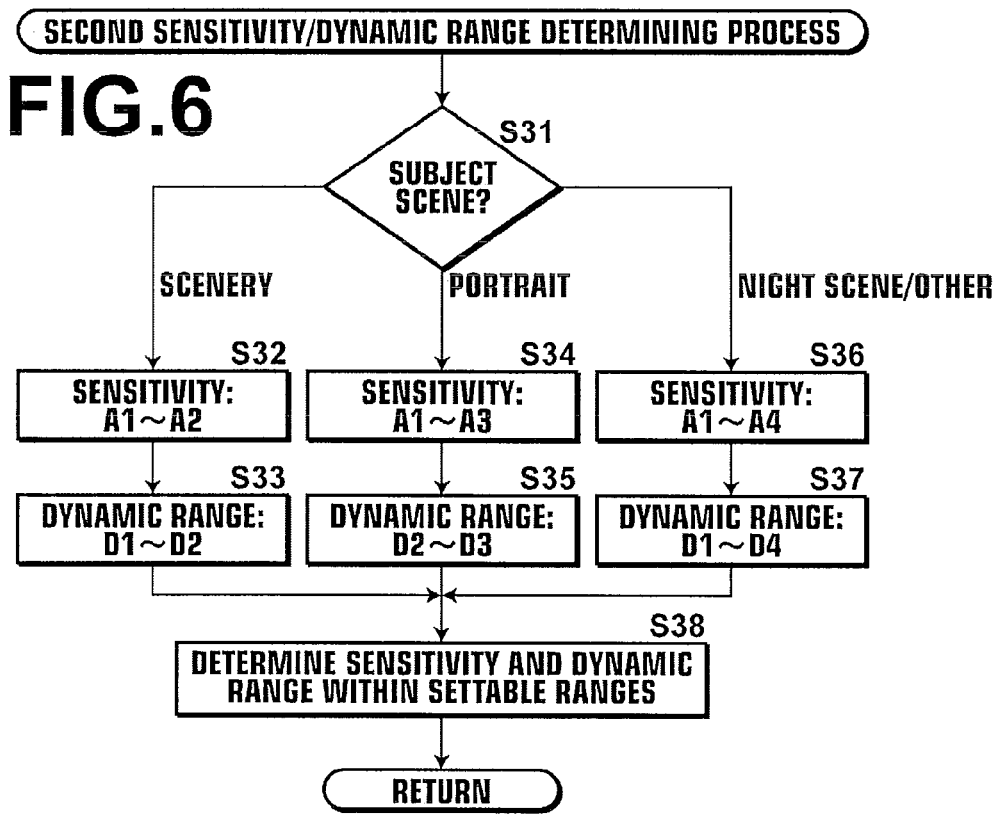
FIG. 6 is a flow chart that illustrates the steps of a second process for determining sensitivity and dynamic range values.
Figure 7:
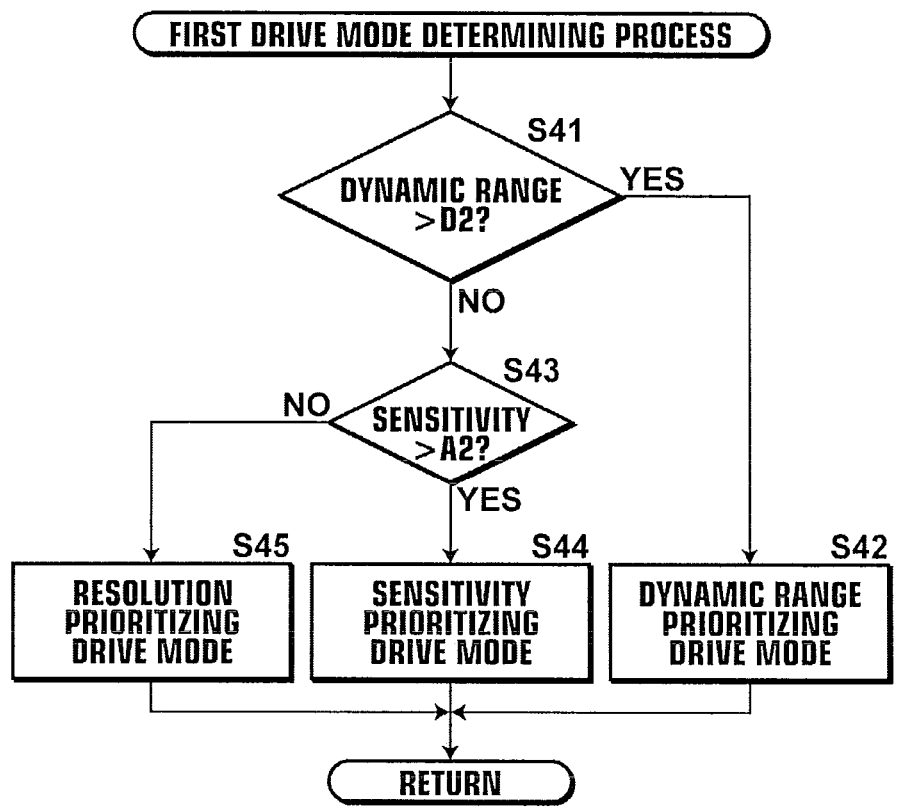
FIG. 7 is a flow chart that illustrates the steps of a drive mode determining process.

Next, imaging which is performed by the digital camera 1 having the configuration described above will be described. FIG. 4 is a flow chart that illustrates the steps of an imaging process executed by the digital camera 1. FIG. 5 is a flow chart that illustrates the steps of a first process for determining sensitivity and dynamic range. FIG. 6 is a flow chart that illustrates the steps of a second process for determining sensitivity and dynamic range values. FIG. 7 is a flow chart that illustrates the steps of a drive mode determining process.

As illustrated in FIG. 4, when power is supplied and the digital camera 1 is turned ON, imaging of a subject is initiated (step S1) and the display control section 39 performs control of display of through the lens images. Display of the through the lens images is a process in which image data stored in the frame memory 36 is displayed on the liquid crystal monitor 40. The face detecting section 43 periodically performs face detection within the through the lens images.

Next, the CPU 30 judges whether the shutter release button 27 has been depressed halfway (step S2). In the case that the shutter release button 27 is not depressed halfway (step S2: NO), the CPU 30 repeats the process of step S2 until the shutter release button 27 is depressed halfway. In the case that the shutter release buttons 27 is depressed halfway (step S2:

YES), the AE processing section 33 performs an AE process (step S3), and the AF processing section 34 performs an AF process (step S4). At this time, the AWB processing section 34 may also perform an AWB process.

Next, the subject scene is automatically discriminated by the scene discriminating section 44 (step S5). Thereafter, the imaging condition determining section 45 determine a sensitivity value and a dynamic range value as imaging conditions (step S6).

The process for determining the sensitivity value and the dynamic range value involves the following steps, as illustrated in FIG. 5. The scene which was discriminated by the discriminating section 44 is judged (step S21). In the case that the subject scene is scenery (step S21: SCENERY), drive pattern 1 illustrated in FIG. 2 is selected as the drive pattern to be employed (step S22). In the case that the subject scene is a portrait (step S21: PORTRAIT), drive pattern 2 illustrated in FIG. 2 is selected as the drive pattern to be employed (step S23). In the case that the subject scene is a night scene (step S21: NIGHT SCENE), drive pattern 3 illustrated in FIG. 2 is selected as the drive pattern to be employed (step S24).

When the drive pattern to be employed is determined, the imaging condition determining section 45 ultimately determines the sensitivity value and the dynamic range value based on the photometric value data detected by the AE processing section 33, and set exposure values such as aperture value and exposure time (shutter speed), within the settable ranges limited by the determined drive pattern (step S25).

Note that in the present embodiment, the drive pattern determining section 46 determines a single drive pattern from among at least two drive patterns to set the settable ranges of the sensitivity and dynamic range. However, the present invention is not limited to this configuration. An alternate method for determining the sensitivity value and the dynamic range value will be described. Note that in the case that this alternate method is utilized, the digital camera 1 does not need to be equipped with the drive pattern determining section 46. However, the digital camera 1 needs to be equipped with a setting means for setting settable ranges for the sensitivity and the dynamic range of the CCD 13. Note that the imaging condition determining section 45 may function as the setting means.

FIG. 6 is a flow chart that illustrates the steps of the alternate method for determining sensitivity and dynamic range values. The scene which was discriminated by the discriminating section 44 is judged (step S31). In the case that the subject scene is scenery (step S31: SCENERY), the settable range of the sensitivity value A is set to be from A1 to A2 (A1<A≦A2) (step S32), and the settable range of the dynamic range value D set to be a range from D1 to D4 (D1<D≦D4) (step S33).

In the case that the subject scene is a portrait (step S31: PORTRAIT), the settable range of the sensitivity value A is set to be from A1 to A3 (A1<A≦A3) (step S34), and the settable range of the dynamic range value D set to be a range from D2 to D3 (D2<D≦D3) (step S35). In the case that the subject scene is a night scene (or another scene) (step S31: NIGHT SCENE), the settable range of the sensitivity value A is set to be from A1 to A4 (A1<A≦A4) (step S36), and the settable range of the dynamic range value D set to be a range from D1 to D4 (D1<D≦D4) (step S37). Note that at this time, D1, D2, D3, and D4 and A1, A2, A3, and A4 satisfy the conditions of D1<D2<D3<D4 and A1<A2<A3<A4.

Thereafter, the imaging condition determining section 45 ultimately determines the sensitivity value and the dynamic range value based on the photometric value data detected by the AE processing section 33, and set exposure values such as aperture value and exposure time (shutter speed), within the settable ranges which are set as described above (step S38).

When the values of the sensitivity and the dynamic range are determined by one of the processes described above, the drive mode determining section 47 performs a process to determine a drive mode to be employed (step S7), as illustrated in FIG. 4. Note that the dynamic range value and the sensitivity value determined by the imaging condition determining section 45 are input into the AE processing section 33, and the AE processing section 33 ultimately determines exposure setting values such as an aperture value and an exposure time (shutter speed) based on the input dynamic range value and the sensitivity value.

A drive mode may be determined by applying the sensitivity value and the dynamic range value determined as described above to the drive pattern of FIG. 2 which has been determined based on the scene discriminated by the scene discriminating section 44. Alternatively, a process for determining a drive mode illustrated in FIG. 7 may be performed. In the process for determining a drive mode illustrated in FIG. 7, the drive mode determining section 47 judges whether the dynamic range value D is greater than a predetermined value D2 (step S41). In the case that the result of judgment is affirmative (step S41: YES), the dynamic range prioritizing drive mode is determined as the drive mode to be employed (step S42).

On the other hand, in the case that the result of judgment at step S41 is negative (step S41: NO), the drive mode determining section 47 judges whether the sensitivity value A is greater than the value A2 (step S43). In the case that the result of judgment at step S43 is affirmative (step S43: YES), the sensitivity prioritizing drive mode is determined as the drive mode to be employed (step S44). On the other hand, in the case that it is judged that the sensitivity value A is less than or equal to the predetermined value A2 (step S43: NO), the resolution prioritizing drive mode is determined as the drive mode to be employed (step S45).

A single drive mode which is suited to a subject scene is enabled to be set for each subject scene as described above. At the same time, the settable ranges for sensitivity values and dynamic range values are limited according to each subject scene. Thereby, the selectable drive modes and the settable values for the sensitivity and dynamic range are limited according to the discrimination results of the subject scene. The sensitivity value and the dynamic range value are ultimately set within the limited ranges based on the subject field data, and a drive mode is selected based on the set sensitivity value and the set dynamic range value. Therefore, the ultimately determined drive mode is based on both the discrimination results of the subject scene and the obtained subject field data. In addition, the sensitivity value and the dynamic range value are selected from at least one type of drive mode corresponding to each subject scene. That is, a single drive mode is selected according to the subject field data. Therefore, there are cases in which a different drive mode is determined even if the same subject scene is discriminated, if the subject field data are different. Accordingly, an optimal drive mode for the subject can be determined.

After the process for determining the drive mode is completed in the manner described above, the CPU 30 judges whether the shutter release button 27 has been fully depressed (step S8). In the case that the shutter release button 27 is not fully depressed (step S8: NO), the CPU 30 judges whether the half depression of the shutter release button 27 has been released (step S9). In the case that the half depression of the shutter release button 27 has been released (step S9: YES), the process returns to step S2. In the case that the half depression of the shutter release button 27 has not been released (step S9: NO), the process returns to step S8, and the steps S8 and S9 are repeated.

On the other hand, in the case that it is judged that the shutter release button 27 has been fully depressed in step S8 (step S8: YES), the CPU 30 causes the focusing lens driving section 20a, the aperture driving section 21, and the shutter driving section 22 to drive the focusing lens 10a, the aperture 11, and the shutter 12 according to the focus driving amount data determined by the AF processing section 32 and the exposure values set by the AE processing section, and causes the CCD driving section 23 to drive the CCD 13 according to the drive mode determined by the drive mode determining section 47, to perform actual imaging (step S10). Thereafter, the CPU 30 causes the image signal processing section 41 to administer image processes on the final image which has been obtained by the actual imaging, according to the drive mode determined by the drive mode determining section 47 (step S11).

Next, the final image, onto which image processes have been administered by the image signal processing section 41, is displayed on the liquid crystal monitor 40 via the display control section 39, and recorded in the external recording medium 38 via the media control section 37 (step S12). Note that at this time, an image file may be generated by the compression/decompression processing section 35 administering a compression process onto the final image data, on which the image processes have been administered.

Then, the CPU 30 judges whether power has been turned OFF (step S13). In the case that the result of judgment at step S13 is negative (step S13: NO), the process returns to step S1, and the steps following thereafter are repeated. In the case that power has been turned OFF (step S13: YES), the power supply to the digital camera 1 is turned OFF, and the process ends. The digital camera 1 performs imaging processes in the manner described above.

According to the imaging apparatus 1 and the imaging method of the present embodiment, image signals are obtained based on the outputs of at least one of the first light receiving elements and the second light receiving elements; the subject scene is discriminated and the subject field data is obtained based on the obtained image signals; a drive mode is selected based on the obtained subject scene and the obtained subject field data; the CCD 13 is driven according to the selected drive mode to obtain image signals; and image data is generated from the obtained image signals. Therefore, optimal images of subjects can be obtained, because the CCD 13 is driven and controlled and image processes are administered according to a drive mode selected based on data regarding both the subject scene and the subject field.

Figure 8:
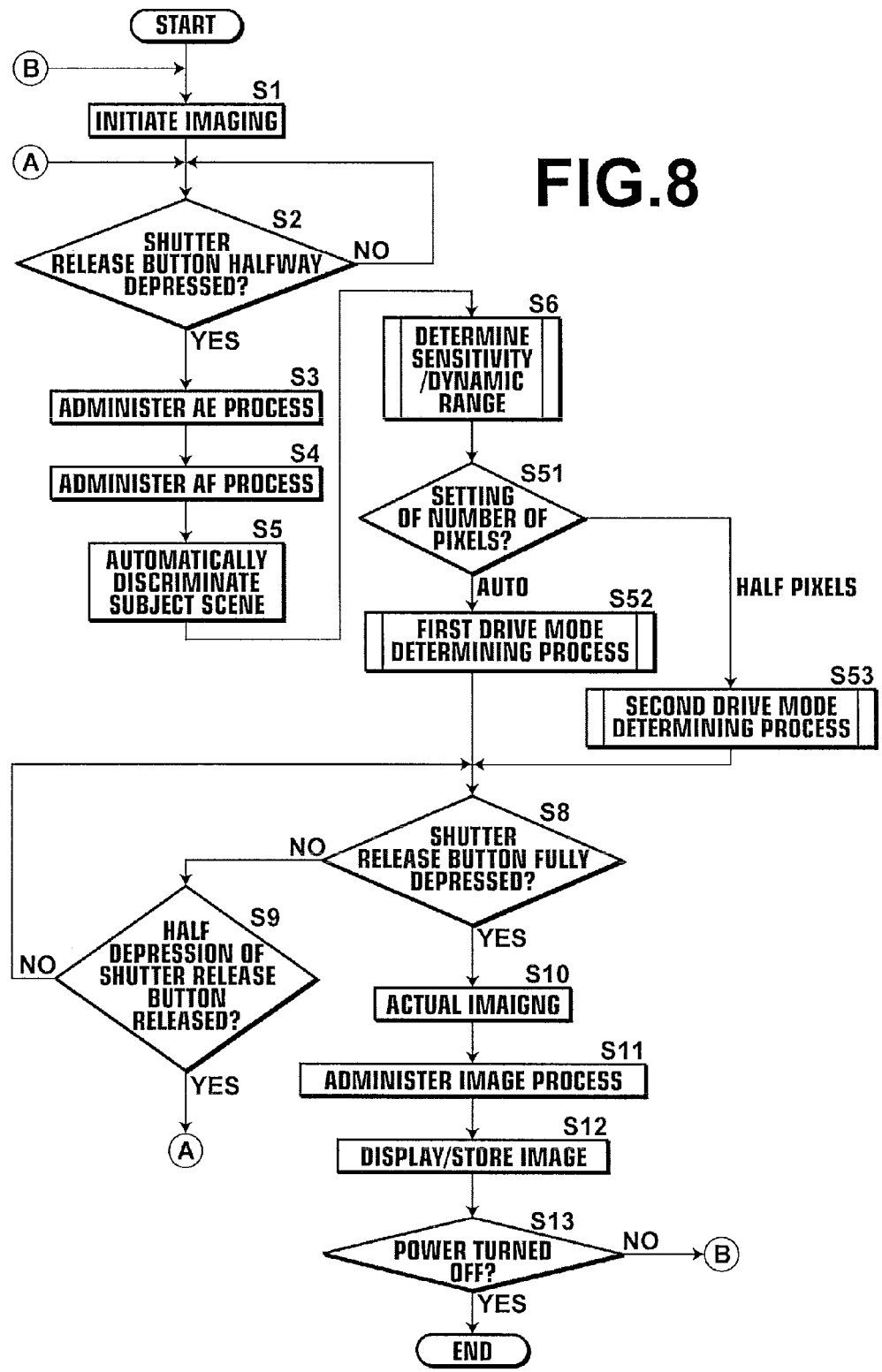
FIG. 8 is a flow chart that illustrates the steps of an alternate imaging process.
Figure 10:
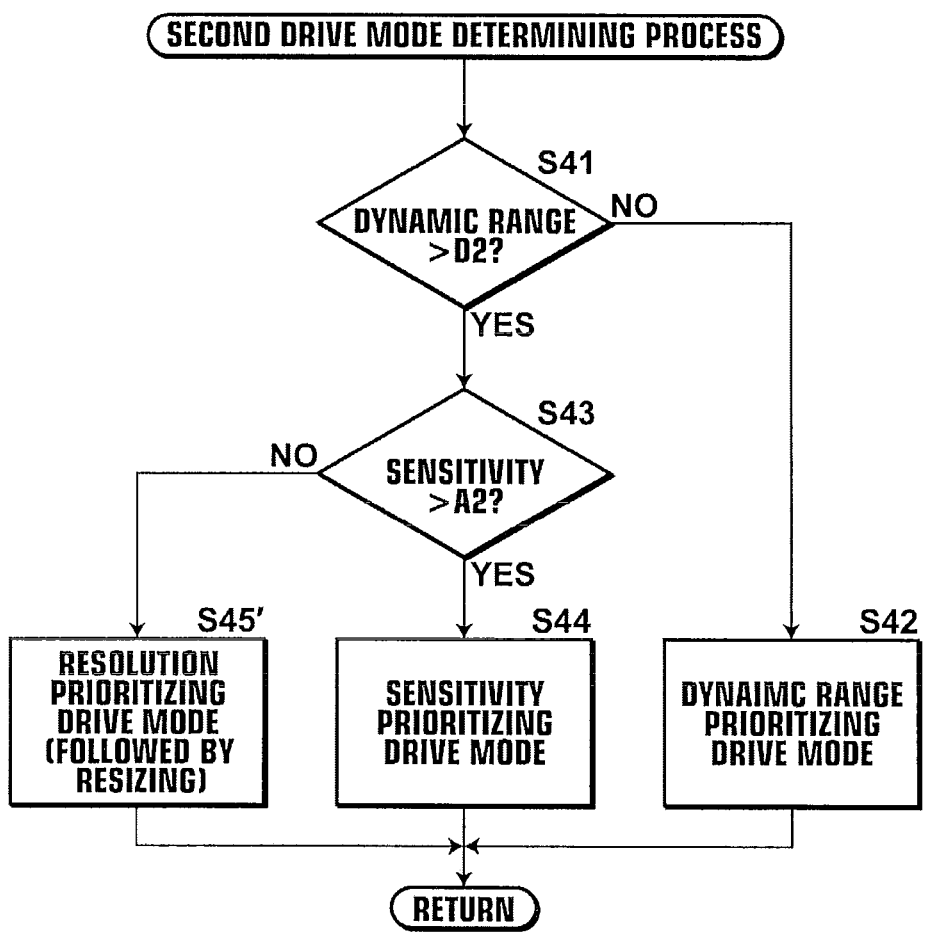
FIG. 10 is a flow chart that illustrates a second drive mode determining process.

Next, an alternate imaging process which may be performed by the digital camera 1 will be described. FIG. 8 is a flow chart that illustrates the steps of the alternate imaging process. FIG. 9 is a diagram that illustrates alternate examples of various drive patterns. FIG. 10 is a flow chart that illustrates a second drive mode determining process. Note that in FIG. 8, the steps which are the same as those illustrated in FIG. 4 are denoted by the same step numbers, and detailed descriptions thereof will be omitted.

As illustrated in FIG. 8, after the imaging condition determining section 45 determine the values for sensitivity and dynamic range, the CPU judges the setting of the number of pixels to be recorded (step S51). Here, the setting of the number of pixel to be recorded may be set as desired by a user by operating the operating section 26. However, when the automatic scene discriminating mode is turned ON, the number of pixels of CCD-RAW data is switched according to drive modes. Therefore, a full pixel setting is disabled.

In the case that the CPU judges that the number of pixels is automatically set (step S51: AUTO), the drive mode determining section 47 performs a first drive mode determining process (step S52). The first drive mode determining process is the same as that illustrated in FIG. 7, and therefore a detailed description thereof will be omitted. A drive mode may be determined by applying the sensitivity value and the dynamic range value determined in step S6 to drive pattern 4 of FIG. 9, which has been determined based on the scene discriminated by the scene discriminating section 44.

The drive patterns illustrated in FIG. 9 are set in the camera main body in advance, and are recorded in the internal memory 42, for example. In the case that the number of pixels to be recorded are automatically set, drive pattern 4 is selected as the drive pattern to be employed. In drive pattern 4, resolution prioritizing drive modes are selected in cases in which the dynamic range D is within a range from D1 to D2 (D1<D≦D2) and the sensitivity A is within a range from A1 to A2 (A1<A≦A2), sensitivity prioritizing modes are selected in cases in which the dynamic range D is within a range from D1 to D2 (D1<D≦D2) and the sensitivity A is within a range from A2 to A4 (A2<A≦A4), and dynamic range prioritizing drive modes are selected in cases in which the dynamic range D is within a range from D2 to D4 (D2<D≦D4) and the sensitivity A is with a range from A1 to A4 (A1<A≦A4).

On the other hand, in the case that the CPU 30 judges that the number of pixels to be recorded is half pixels (step S51: HALF PIXELS), the drive mode determining section 47 performs a second drive mode determining process (step S53).

The second drive mode determining process may determine the drive mode to be employed by applying the sensitivity value and the dynamic range value determined in step S6 to drive pattern 5 of FIG. 9, which has been determined based on the scene discriminated by the scene discriminating section 44.

The drive patterns illustrated in FIG. 9 are set in the camera main body in advance, and are recorded in the internal memory 42, for example. In the case that the number of pixels to be recorded are half pixels, drive pattern 5 is selected as the drive pattern to be employed. In drive pattern 5, resolution prioritizing drive modes are selected in cases in which the dynamic range D is within a range from D1 to D2 (D1<D≦D2) and the sensitivity A is within a range from A1 to A2 (A1<A≦A2).

Note that when half pixels are set, the CCD driving section 23 drives the CCD 13 in the resolution prioritizing drive modes, and a single image data set is generated by the image signal processing section 41. Thereafter, a signal process is administered to resize the image data set by reducing the number of pixels of the image data set to half. At this time, pixels of the image data set may be thinned out at constant intervals such that the number of pixels is halved, or output signals of the pixels can be combined to generate a single output image data set, in order to resize the image data set.

In addition, in drive pattern 5, sensitivity prioritizing modes are selected in cases in which the dynamic range D is within a range from D1 to D2 (D1<D≦D2) and the sensitivity A is within a range from A2 to A4 (A2<A≦A4), and dynamic range prioritizing drive modes are selected in cases in which the dynamic range D is within a range from D2 to D4 (D2<D≦D4) and the sensitivity A is with a range from A1 to A4 (A1<A≦A4).

The second drive mode determining process may be executed by the steps illustrated in the flow chart of FIG. 10.

Note that in FIG. 10, steps which are the same as those illustrated in the flow chart of FIG. 7 are labeled with the same step numbers, and detailed descriptions thereof will be omitted.

As illustrated in FIG. 10, in the case that the drive mode determining section 47 judges that the sensitivity value A is less than or equal to the value A2 (step S43: NO), the resolution prioritizing drive mode is determined as the drive mode to be employed (step S45'), the CCD driving section 23 drives the CCD 13 according to the resolution prioritizing drive mode, the image signal processing section 41 secures a number of pixels and generates the single image data set, then performs a signal process to resize the image such that the number of pixels is halved. The methods described above may be employed to resize the image.

After the process for determining the drive mode is performed, the steps from step S8 through step S13 are performed as illustrated in FIG. 8, and the imaging process by the digital camera 1 is completed.

As described above, the CCD driving section 23 drives the CCD 13 and the signal processes are performed by the image signal processing section 41 according to the drive mode selected based on both the subject scene and the subject field data, while securing a number of pixels to be recorded, even when the number of pixels to be recorded is set by a user. Therefore, optimal images can be obtained of subjects at a set number of pixels to be recorded.

Figure 11:
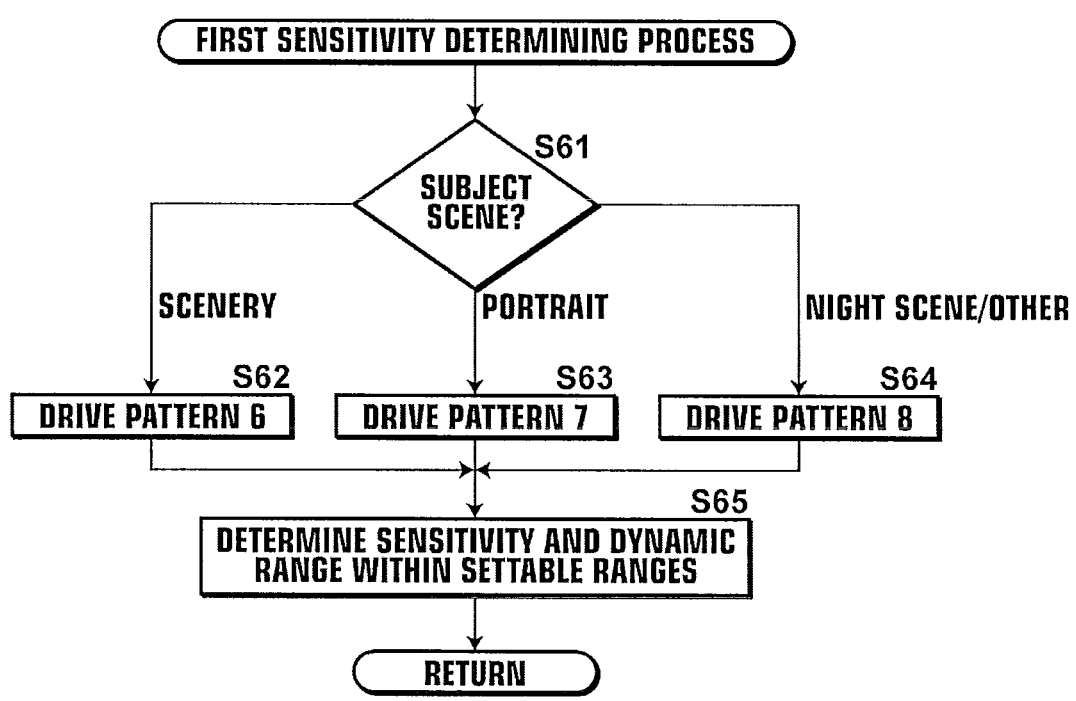
FIG. 11 is a flow chart that illustrates the steps of a first sensitivity determining process.
Figure 13:
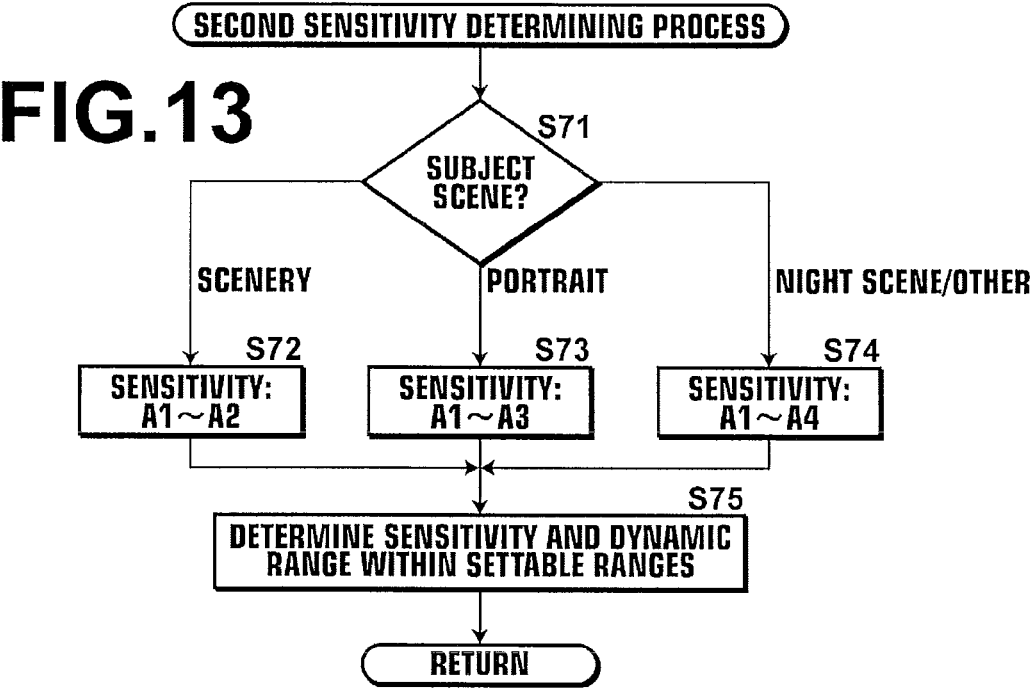
FIG. 13 is a flow chart that illustrates the steps of a second sensitivity determining process.
Figure 14:
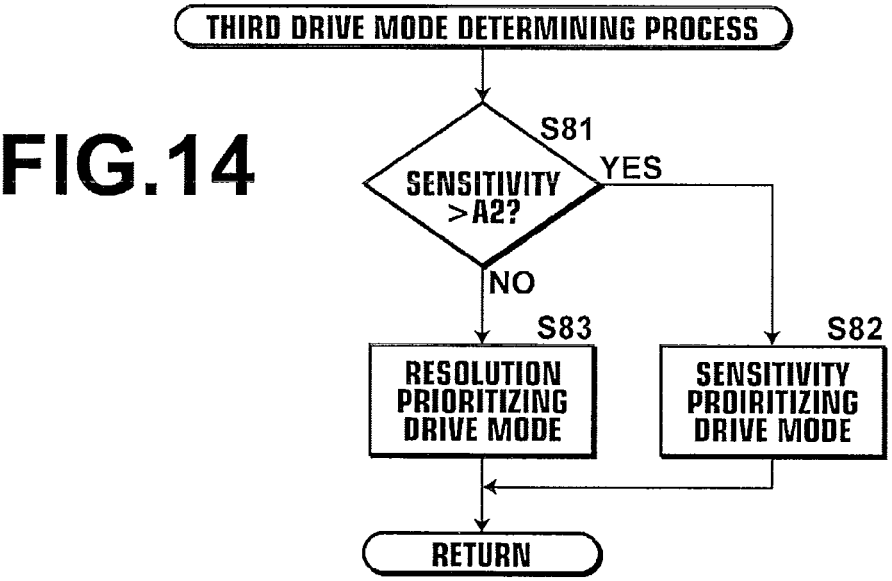
FIG. 14 is a flow chart that illustrates the steps of a third drive mode determining process.

Next, another alternate imaging method will be described. FIG. 11 is a flow chart that illustrates the steps of a first sensitivity determining process. FIG. 12 is a diagram that illustrates further examples of various drive patterns. FIG. 13 is a flow chart that illustrates the steps of a second sensitivity determining process. FIG. 14 is a flow chart that illustrates the steps of a third drive mode determining process.

In the embodiments described above, the drive mode was selected based on both the sensitivity value and the dynamic range value. However, in the case that the imaging condition determining section 45 of FIG. 1 determines only the imaging sensitivity based on photometric data, aperture value and exposure time (shutter speed) obtained by the AE processing section 33 and the digital camera does not or cannot expand dynamic range, the dynamic range is fixed, and a sensitivity determining process that determines only the sensitivity value is performed instead of the process for determining the sensitivity value and the dynamic range value at step S6 of FIG. 4.

In the sensitivity determining process illustrated in FIG. 11, the drive pattern determining section 46 judges the subject scene discriminated by the scene discriminating section 44 (step S61). In the case that the subject scene is scenery (step S61: SCENERY), drive pattern 6 illustrated in FIG. 12 is selected (step S62). In the case that the subject scene is a portrait (step S61: PORTRAIT), drive pattern 7 illustrated in FIG. 12 is selected (step S63). In the case that the subject scene is a night scene (including other scenes) (step S61: NIGHT SCENE), drive pattern 8 illustrated in FIG. 12 is selected (step S64).

The drive patterns illustrated in FIG. 12 are set in the camera main body in advance, and are recorded in the internal memory 42, for example. The dynamic range values of drive patterns 6, 7, and 8 are fixed. In drive pattern 6, which is selected in the case that the subject scene is scenery, the sensitivity A of the CCD 13 is limited to be settable within a range from A1 to A2 (A1<A≦A2). Resolution prioritizing drive modes are selected within this range.

In drive pattern 7, which is selected in the case that the subject scene is a portrait, the sensitivity A of the CCD 13 is limited to be settable within a range from A1 to A3 (A1<A≦A3). Within this range, resolution prioritizing drive modes are selected when the sensitivity A is within a range from A1 to A2 (A1<A≦A2), and sensitivity prioritizing drive modes are selected when the sensitivity A is within a range from A2 to A3 (A2<A≦A3).

In drive pattern 8, which is selected in the case that the subject scene is a night scene, the sensitivity A of the CCD 13 is limited to be settable within a range from A1 to A4 (A1<A≦A4). Within this range, resolution prioritizing drive modes are selected when the sensitivity A is within a range from A1 to A2 (A1<A≦A2), and sensitivity prioritizing drive modes are selected when the sensitivity A is within a range from A2 to A4 (A2<A≦A4).

After the drive pattern is selected, the imaging condition determining section 45 ultimately determines the sensitivity value from the brightness of the subject as a whole, for example, based on the photometric value data detected by the AE processing section 33, and set exposure values such as aperture value and exposure time (shutter speed), within the settable ranges limited by the determined drive pattern (step S65).

Note that in the present embodiment, the drive pattern determining section 46 determines a single drive pattern from among at least two drive patterns to set the settable ranges of the sensitivity. However, the present invention is not limited to this configuration. An alternate method for determining the sensitivity value will be described. Note that in the case that this alternate method is utilized, the digital camera 1 does not need to be equipped with the drive pattern determining section 46. However, the digital camera 1 needs to be equipped with a setting means for setting settable ranges for the sensitivity of the CCD 13.

In the second sensitivity determining process illustrated in FIG. 13, the setting means (not shown) judges the subject scene which has been discriminated by the scene discriminating section 44 at step S5 (step S71). In the case that the subject scene is scenery (step S71: SCENERY), the settable range for the sensitivity value A is set to be from A1 to A2 (A1<A≦A2) (step S72).

In the case that the subject scene is a portrait (step S71: PORTRAIT), the settable range for the sensitivity value A is set to be from A1 to A3 (A1<A≦A3) (step S73). In the case that the subject scene is a night scene (step S71: NIGHT SCENE), the settable range for the sensitivity value A is set to be from A1 to A4 (A1<A≦A4) (step S74). Note that here, A1, A2, A3, and A4 satisfy the condition: A1<A2<A3<A4.

Next, the imaging condition determining section 45 ultimately determines the sensitivity value from the brightness of the subject as a whole, for example, based on the photometric value data detected by the AE processing section 33, and set exposure values such as aperture value and exposure time (shutter speed), within the settable ranges (step S75).

After the process for determining the sensitivity value is performed as described above, the drive mode determining section 47 performs a drive mode determining process (step S7). Note that the sensitivity value determined by the imaging condition determining section 45 and the fixed dynamic range value are input into the AE processing section 33, and the AE processing section 33 ultimately determines exposure setting values such as an aperture value and an exposure time (shutter speed) based on the input dynamic range value and the sensitivity value.

A drive mode may be determined by applying the sensitivity value determined as described above to the drive pattern of FIG. 12 which has been determined based on the scene discriminated by the scene discriminating section 44. Alternatively, a third process for determining a drive mode illustrated in FIG. 14 may be performed. In the third process for determining a drive mode illustrated in FIG. 14, the drive mode determining section 47 judges whether the sensitivity value A is greater than a predetermined value A2 (step S81). In the case that the result of judgment is affirmative (step S81: YES), the sensitivity prioritizing drive mode is determined as the drive mode to be employed (step S82). In the case that the result of judgment is negative (step S81: NO), the resolution prioritizing drive mode is determined as the drive mode to be employed (step S83).

As described above, one or more drive modes are enabled to be selected for each subject scene, and the settable range of the sensitivity value for each subject scene is limited as described above. Thereby, the selectable drive mode and the settable sensitivity value are set limited based on the discrimination results of the subject scene, and the sensitivity value is ultimately determined within the limited range. Therefore, the selected drive mode is based on both the discrimination results of the subject scene and the subject field data. In addition, the sensitivity value is selected from at least one type of drive mode corresponding to each subject scene. That is, a single drive mode is selected according to the subject field data. Therefore, there are cases in which a different drive mode is determined even if the same subject scene is discriminated, if the subject field data are different. Accordingly, an optimal drive mode for the subject can be determined.

The CCD 13 is driven and controlled and image processes are administered according to a drive mode selected based on both the subject scene and the subject field data as in the previous embodiments, even in cases that the dynamic range is fixed as in the present embodiment. Thereby, optimal images of subjects can be obtained.

Note that in the CCD 13 of the embodiments described above, the light receiving areas of the first light receiving elements and the second light receiving elements are equal. However, the present invention is not limited to this configuration. The light receiving areas of the first light receiving elements may be greater than those of the second light receiving elements, for example. That is, the first light receiving elements may have higher sensitivities than the second light receiving elements.

Consider an example in which the sub pixels corresponding to the second light receiving elements have the same saturation point as the main pixels corresponding to the first light receiving elements, but have a sensitivity ¼ that of the main pixels. In this case, because the output signals of the sub pixels are ¼ the signals output by the main pixels, the signals are quadrupled in the resolution prioritizing drive mode.

In the sensitivity prioritizing drive mode, the added output signals are 1.25 times the signals output by only the main pixels. Therefore, the sensitivity becomes 1.25 times with respect to full pixels.

If the first method is employed in the dynamic range prioritizing drive mode, the two types of image signals having the different outputs of the main pixels and the sub pixels are combined, to generate the image data in which dynamic range has been expanded. If the second method is employed in the dynamic range prioritizing drive mode, the output signals of the sub pixels are ¼ the signals output by the main pixels, and therefore the signals are quadrupled.

Note that the methods described in U.S. Patent Application Publication No. 20070223059 may be utilized as the CCD driving methods and the image processing methods.

In addition, the imaging apparatus of the present invention is not limited to the digital camera 1 of the embodiments described above. Various changes and modifications are possible, as long as they do not stray from the spirit and scope of the present invention.

What is claimed is:

1. An imaging apparatus, comprising:
   an imaging section constituted by a number of first light receiving elements and second light receiving elements that photoelectrically convert light from subjects, which are capable of being controlled so as to be driven independently from each other and are arranged in a predetermined arrangement, for obtaining image signals based on the output of at least one of the first light receiving elements and the second light receiving elements;
   an image signal processing section, for generating image data from the image signals obtained by the imaging section;
   a subject discriminating section, for discriminating subject scenes based on the image signals;
   a subject field data obtaining section, for obtaining subject field data based on the image signals;
   a control section, for selecting a drive mode from among a plurality of drive modes that represent types of driving methods, which include
      whether the first light receiving elements and the second light receiving elements are driven under the same conditions or under different conditions, and
      types of image data generation methods by which the image signal processing section generates image data,
   said control section selecting said drive mode based on the subject scenes discriminated by the subject discriminating section and the subject field data obtained by the subject field data obtaining section, and
      for driving the imaging section and the image signal processing section according to the selected drive mode;
   a drive pattern determining section, for determining a drive pattern from among at least two types of drive patterns that include at least one type of drive modes, in which the range of at least one imaging condition of the imaging section is set, based on the subject scene discriminated by the subject discriminating section; and
   a drive mode determining section, for determining a drive mode from among the at least one type of drive mode of the drive pattern determined by the drive pattern determining section, based on the subject field data obtained by the subject field data obtaining section;
   wherein:
   the control section drives the imaging section and the image signal processing section with the drive mode determined by the drive mode determining section.

2. An imaging apparatus as defined in claim 1, further comprising:
   a setting section, for setting a settable range of at least one of a sensitivity value and a dynamic, range value of the imaging section, based on the subject scene discriminated by the subject discriminating section;
   an imaging condition determining section, for determining the value of at least one of the sensitivity value and the dynamic range value within the at least one range set by the setting section, based on the subject field data obtained by the subject field data obtaining section; and
   said drive mode determining section determining a drive mode based on at least one of the sensitivity value and the dynamic range value determined by the imaging condition determining section; wherein:

the control section drives the imaging section and the image signal processing section with the drive mode determined by the drive mode determining section.

3. An imaging apparatus as defined in claim 2, wherein: the drive mode is one of: a resolution prioritizing drive mode; a sensitivity prioritizing drive mode; and a dynamic range prioritizing drive mode.

4. An imaging apparatus as defined in claim 3, wherein: the drive mode is a dynamic range prioritizing drive mode, and when the imaging section and the image signal processing section are driven in the dynamic range prioritizing drive mode, the control section switches between a first imaging method, in which the imaging section performs imaging with different exposures for the first light receiving elements and the second light receiving elements and the image signal processing section processes image signals formed based on the outputs of the first light receiving elements and the second light receiving elements that have performed imaging with different exposures to obtain image data, and a second imaging method, in which the imaging section performs imaging with the first light receiving elements and the second light receiving elements at the same underexposure and the image signal processing section administers gradation correcting processes on image signals formed based on the outputs of the first light receiving elements and the second light receiving elements to obtain image data.

5. An imaging apparatus as defined in claim 1, wherein: the drive patterns are set for each of the subject scenes.

6. An imaging apparatus as defined in claim 5, wherein: the drive mode is one of: a resolution prioritizing drive mode; a sensitivity prioritizing drive mode; and a dynamic range prioritizing drive mode.

7. An imaging apparatus as defined in claim 5, wherein: the subject scene is one of: scenery; portrait; and night scene;
the drive pattern includes only the dynamic range prioritizing drive mode when the subject scene is a portrait, and the range of values for the dynamic range is set from D2 to D3 and the range of values for the sensitivity is set from A1 to A3 in the dynamic range prioritizing drive mode;
the drive pattern includes the resolution prioritizing drive mode and the dynamic range prioritizing drive mode when the subject scene is scenery, the range of values for the dynamic range is set from D1 to D2 and the range of values for the sensitivity is set from A1 to A2 in the resolution prioritizing drive mode, and the range of values for the dynamic range is set from D2 to D4 and the range of values for the sensitivity is set from A1 to A2 in the dynamic range prioritizing drive mode;
the drive pattern includes the resolution prioritizing drive mode, the sensitivity prioritizing drive mode, and the dynamic range prioritizing drive mode when the subject scene is night scene, the range of values for the dynamic range is set from D1 to D2 and the range of values for the sensitivity is set from A1 to A2 in the resolution prioritizing drive mode, the range of values for the dynamic range is set from D1 to D2 and the range of values for the sensitivity is set from A2 to A4 in the sensitivity prioritizing drive mode, and the range of values for the dynamic range is set from D2 to D4 and the range of values for the sensitivity is set from A1 to A4 in the dynamic range prioritizing drive mode; and
D1, D2, D3, and D4 and A1, A2, A3, and A4 satisfy the conditions of D1<D2<D3<D4 and A1<A2<A3<A4.

8. An imaging apparatus as defined in claim 6, wherein: the drive mode is a dynamic range prioritizing drive mode, and when the imaging section and the image signal processing section are driven in the dynamic range prioritizing drive mode, the control section switches between a first imaging method, in which the imaging section performs imaging with different exposures for the first light receiving elements and the second light receiving elements and the image signal processing section processes image signals formed based on the outputs of the first light receiving elements and the second light receiving elements that have performed imaging with different exposures to obtain image data, and a second imaging method, in which the imaging section performs imaging with the first light receiving elements and the second light receiving elements at the same underexposure and the image signal processing section administers gradation correcting processes on image signals formed based on the outputs of the first light receiving elements and the second light receiving elements to obtain image data.

9. An imaging apparatus as defined in claim 8, wherein: the subject scene is one of: scenery; portrait; and night scene.

10. An imaging apparatus as defined in claim 1, wherein: the drive mode is one of: a resolution prioritizing drive mode; a sensitivity prioritizing drive mode; and a dynamic range prioritizing drive mode.

11. An imaging apparatus as defined in claim 10, wherein: the drive mode is a dynamic range prioritizing drive mode, and when the imaging section and the image signal processing section are driven in the dynamic range prioritizing drive mode, the control section switches between a first imaging method, in which the imaging section performs imaging with different exposures for the first light receiving elements and the second light receiving elements and the image signal processing section processes image signals formed based on the outputs of the first light receiving elements and the second light receiving elements that have performed imaging with different exposures to obtain image data, and a second imaging method, in which the imaging section performs imaging with the first light receiving elements and the second light receiving elements at the same underexposure and the image signal processing section administers gradation correcting processes on image signals formed based on the outputs of the first light receiving elements and the second light receiving elements to obtain image data.

12. An imaging apparatus as defined in claim 1, wherein: the drive mode is one of a resolution prioritizing drive mode; a sensitivity prioritizing drive mode; and a dynamic range prioritizing drive mode.

13. An imaging apparatus as defined in claim 12, wherein: the drive mode is a dynamic range prioritizing drive mode, and when the imaging section and the image signal processing section are driven in the dynamic range prioritizing drive mode, the control section switches between a first imaging method, in which the imaging section performs imaging with different exposures for the first light receiving elements and the second light receiving elements and the image signal processing section processes image signals formed based on the outputs of the first light receiving elements and the second light receiving elements that have performed imaging with different exposures to obtain image data, and a second imaging method, in which the imaging section performs imaging with the first light receiving elements and the second light receiving elements at the same underexposure and the image signal processing section administers gradation correcting processes on image signals formed based on the outputs of the first light receiving elements and the second light receiving elements to obtain image data.

14. An imaging apparatus as defined in claim 1, wherein: the subject scene is one of: scenery; portrait; and night scene.

15. An imaging apparatus as defined in claim 1, wherein:
the subject scene is one of: scenery; portrait; and night scene;
the drive pattern includes only the dynamic range prioritizing drive mode when the subject scene is a portrait, and the range of values for the dynamic range is set from D2 to D3 and the range of values for the sensitivity is set from A1 to A3 in the dynamic range prioritizing drive mode;
the drive pattern includes the resolution prioritizing drive mode and the dynamic range prioritizing drive mode when the subject scene is scenery, the range of values for the dynamic range is set from D1 to D2 and the range of values for the sensitivity is set from A1 to A2 in the resolution prioritizing drive mode, and the range of values for the dynamic range is set from D2 to D4 and the range of values for the sensitivity is set from A1 to A2 in the dynamic range prioritizing drive mode;
the drive pattern includes the resolution prioritizing drive mode, the sensitivity prioritizing drive mode, and the dynamic range prioritizing drive mode when the subject scene is night scene, the range of values for the dynamic range is set from D1 to D2 and the range of values for the sensitivity is set from A1 to A2 in the resolution prioritizing drive mode, the range of values for the dynamic range is set from D1 to D2 and the range of values for the sensitivity is set from A2 to A4 in the sensitivity prioritizing drive mode, and the range of values for the dynamic range is set from D2 to D4 and the range of values for the sensitivity is set from A1 to A4 in the dynamic range prioritizing drive mode; and
D1, D2, D3, and D4 and A1, A2, A3, and A4 satisfy the conditions of D1<D2<D3<D4 and A1<A2<A3<A4.

16. An imaging method that utilizes an imaging apparatus equipped with an imaging element constituted by a great number of first light receiving elements and second light receiving elements that photoelectrically convert light from subjects, which are capable of being controlled so as to be driven independently from each other and are arranged in a predetermined arrangement, comprising the steps of:
    obtaining image signals based on the output of at least one of the first light receiving elements and the second light receiving elements;
    generating image data from the obtained image signals;
    discriminating subject scenes based on the image signals;
    obtaining subject field data based on the image signals;
    selecting a drive mode, based on the discriminated subject scenes and the obtained subject field data, said drive mode being selected from among a plurality of drive modes that represent types of driving methods, which include
        whether the first light receiving elements and the second light receiving elements are driven under the same conditions or under different conditions, and
        types of image data generation methods by which said image data is generated; and
    driving the imaging element according to the selected drive mode to obtain the image signals, and generating the image data from the image signals,
wherein:
    at least two types of drive patterns that include at least one type of drive modes, in which the range of at least one imaging condition of the imaging element is set in advance, are set;
    a single drive pattern is determined from among the at least two types of drive patterns, based on the discriminated subject scene;
    a drive mode is determined from among the at least one type of drive mode of the determined drive pattern, based on the obtained subject field data; and
    the imaging element is driven with the determined drive mode to obtain the image signals, and the image data is generated from the image signals.

17. An imaging method as defined in claim 16, further comprising the steps of:
    setting a settable range of at least one of a sensitivity value and a dynamic range value of the imaging element, based on the discriminated subject scene;
    determining the value of at least one of the sensitivity value and the dynamic range value within the at least one set range, based on the obtained subject field data; and
    determining a drive mode based on at least one of the determined sensitivity value and the determined dynamic range value; wherein:
    the imaging element is driven with the determined drive mode to obtain the image signals, and the image data is generated from the image signals.

18. An imaging apparatus, comprising:
    imaging means constituted by a number of first light receiving elements and second light receiving elements that photoelectrically convert light from subjects, which are capable of being controlled so as to be driven independently from each other and are arranged in a predetermined arrangement, for obtaining image signals based on the output of at least one of the first light receiving elements and the second light receiving elements;
    image signal processing means, for generating image data from the image signals obtained by the imaging means;
    subject discriminating means, for discriminating subject scenes based on the image signals;
    subject field data obtaining means, for obtaining subject field data based on the image signals; and
    control means, for selecting a drive mode from among a plurality of drive modes that represent types of driving methods, which include
        whether the first light receiving elements and the second light receiving elements are driven under the same conditions or different conditions, and
        types of image data generation methods by which the image signal processing section generates image data,
    based on the subject scenes discriminated by the subject discriminating section and the subject field data obtained by the subject field data obtaining section, and for driving the imaging section and the image signal processing section according to the selected drive mode.

* * * * *